US009715519B2

(12) United States Patent
Atkisson

(10) Patent No.: US 9,715,519 B2
(45) Date of Patent: Jul. 25, 2017

(54) MANAGING UPDATES TO MULTIPLE SETS OF METADATA PERTAINING TO A MEMORY

(71) Applicant: SanDisk Technologies LLC, Plano, TX (US)

(72) Inventor: David Atkisson, Draper, UT (US)

(73) Assignee: SanDisk Technologies LLC, Plano, TX (US)

( * ) Notice: Subject to any disclaimer, the term of this patent is extended or adjusted under 35 U.S.C. 154(b) by 375 days.

(21) Appl. No.: 13/840,418

(22) Filed: Mar. 15, 2013

(65) Prior Publication Data

US 2014/0279941 A1 Sep. 18, 2014

(51) Int. Cl.
*G06F 7/00* (2006.01)
*G06F 17/30* (2006.01)

(52) U.S. Cl.
CPC .............. *G06F 17/30371* (2013.01)

(58) Field of Classification Search
CPC ............... G06F 17/30371; G06F 2212/7201
See application file for complete search history.

(56) References Cited

U.S. PATENT DOCUMENTS

| 5,926,836 A * | 7/1999 | Blumenau ...................... 711/162 |
| 7,085,909 B2 * | 8/2006 | Ananthanarayanan et al. .............................. 711/202 |
| 2008/0229309 A1 * | 9/2008 | McKenney ................... 718/100 |
| 2012/0089764 A1 * | 4/2012 | Baskakov et al. ................ 711/6 |
| 2013/0204902 A1 * | 8/2013 | Wang et al. ................... 707/797 |

\* cited by examiner

*Primary Examiner* — Charles Lu
(74) *Attorney, Agent, or Firm* — Stoel Rives LLP

(57) ABSTRACT

Apparatuses, systems, and methods are disclosed for managing multiple sets of metadata. A method includes maintaining a first set of metadata on a volatile recording medium and a second set of metadata on a non-volatile recording medium. The first and second sets of metadata are associated with one or more logical addresses for data stored on the non-volatile recording medium. The first and second sets of metadata relate to a state of the data. A method includes updating the second set of metadata in response to a first operation performed on the data. The second set may be updated based on the first operation. A method includes updating the first set of metadata in response to a subsequent operation performed on the data. The first set may be updated based on the first operation.

21 Claims, 12 Drawing Sheets

MANAGING UPDATES TO MULTIPLE SETS OF METADATA PERTAINING TO A MEMORY

TECHNICAL FIELD

The present disclosure relates to managing metadata and more particularly relates to managing multiple sets of metadata.

BACKGROUND

Multiple levels or sets of metadata may be used to manage computing devices such as data storage devices, data caches, file systems, and the like. In order to ensure data integrity, consistency, or the like, multiple levels of metadata are typically synchronized. Synchronizing multiple levels of metadata for a device may increase management overhead, may reduce data transfer speeds, or may cause other inefficiencies.

SUMMARY

Methods for managing multiple sets of metadata are presented. In one embodiment, a method includes maintaining a first set of metadata on a volatile medium and a second set of metadata on a non-volatile recording medium. In certain embodiments, the first and second sets of metadata are associated with one or more logical addresses for data stored on the non-volatile recording medium. In one embodiment, the first and second sets of metadata relate to a state of the data. A method, in a further embodiment, includes updating the second set of metadata in response to a first operation performed on the data. The second set, in one embodiment, is updated based on the first operation. In another embodiment, a method includes updating the first set of metadata in response to a subsequent operation performed on the data. The first set, in one embodiment, is updated based on the first operation.

In one embodiment, a method includes detecting a dirty indicator in a logical to physical mapping structure for a non-volatile storage device. A method, in another embodiment, includes checking for a corresponding dirty indicator in a digest in response to detecting a dirty indicator in a logical to physical mapping structure. In a further embodiment, a method includes destaging data corresponding to a dirty indicator in response to detecting a corresponding dirty indicator in a digest. A method, in one embodiment, includes clearing a dirty indicator in a logical to physical mapping structure in response to failing to detect a corresponding indicator in a digest.

Apparatuses for managing multiple sets of metadata are presented. In one embodiment, a metadata module is configured to maintain a first set of metadata on a volatile medium and a second set of metadata on a non-volatile memory medium. In another embodiment, the first and second sets of metadata are associated with one or more logical addresses for data stored on the non-volatile memory medium. In one embodiment, the first and second sets of metadata indicate a state of the data on the non-volatile memory medium. In one embodiment, a discovery module is configured to determine a value of an indicator in the first set of metadata. In a further embodiment, a value of an indicator in the second set of metadata is known without checking the second set of metadata in response to the value of the indicator in the first set of metadata comprising a first state. In a further embodiment, an execution module is configured to perform an operation on data stored on the non-volatile memory medium based on the value of the indicator in the second set of metadata.

In one embodiment, an apparatus includes means for updating a dirty data indicator in a dirty data map for data stored on the non-volatile recording medium. In another embodiment, the update may be in response to a first destaging operation performed on the data without updating a corresponding dirty data indicator in a node of a logical-to-physical mapping structure on a volatile medium for the data. In one embodiment, an apparatus includes means for updating the corresponding dirty data indicator in the node in response to a subsequent destaging operation. In another embodiment, an apparatus includes means for allowing access to the logical-to-physical mapping structure during updating of the dirty data indicator in the dirty data map and restricting access to the logical-to-physical mapping structure during the updating of the corresponding dirty data indicator in the node.

Computer program products are provided. In one embodiment, a computer program product comprises a computer readable storage medium storing computer usable program code. In another embodiment, the program code may executable to perform operations for managing multiple sets of metadata. In a further embodiment, the operations include maintaining a first set of metadata on a volatile medium and a second set of metadata on a non-volatile storage medium. In one embodiment, the first and second sets of metadata are associated with one or more logical addresses for data stored on the non-volatile storage medium. In one embodiment, the first and second sets of metadata may relate to a state of the data on the non-volatile storage medium. In a further embodiment, an operation includes ensure that indicators in the first set of metadata comprising a first state remain synchronized with the second set of metadata. In another embodiment, an operation includes allowing indicators in the first set of metadata comprising a second state to become out of synchronization with the second set of metadata.

References throughout this specification to features, advantages, or similar language do not imply that all of the features and advantages may be realized in any single embodiment. Rather, language referring to the features and advantages is understood to mean that a specific feature, advantage, or characteristic is included in at least one embodiment. Thus, discussion of the features and advantages, and similar language, throughout this specification may, but do not necessarily, refer to the same embodiment.

Furthermore, the described features, advantages, and characteristics of the embodiments may be combined in any suitable manner. One skilled in the relevant art will recognize that the embodiments may be practiced without one or more of the specific features or advantages of a particular embodiment. In other instances, additional features and advantages may be recognized in certain embodiments that may not be present in all embodiments.

These features and advantages of the embodiments will become more fully apparent from the following description and appended claims, or may be learned by the practice of embodiments as set forth hereinafter.

BRIEF DESCRIPTION OF THE DRAWINGS

In order that the advantages of the disclosure will be readily understood, a more particular description of the disclosure briefly described above will be rendered by reference to specific embodiments that are illustrated in the appended drawings. Understanding that these drawings depict only typical embodiments of the disclosure and are not therefore to be considered to be limiting of its scope, the disclosure will be described and explained with additional specificity and detail through the use of the accompanying drawings, in which.

DETAILED DESCRIPTION

Figure 1A:
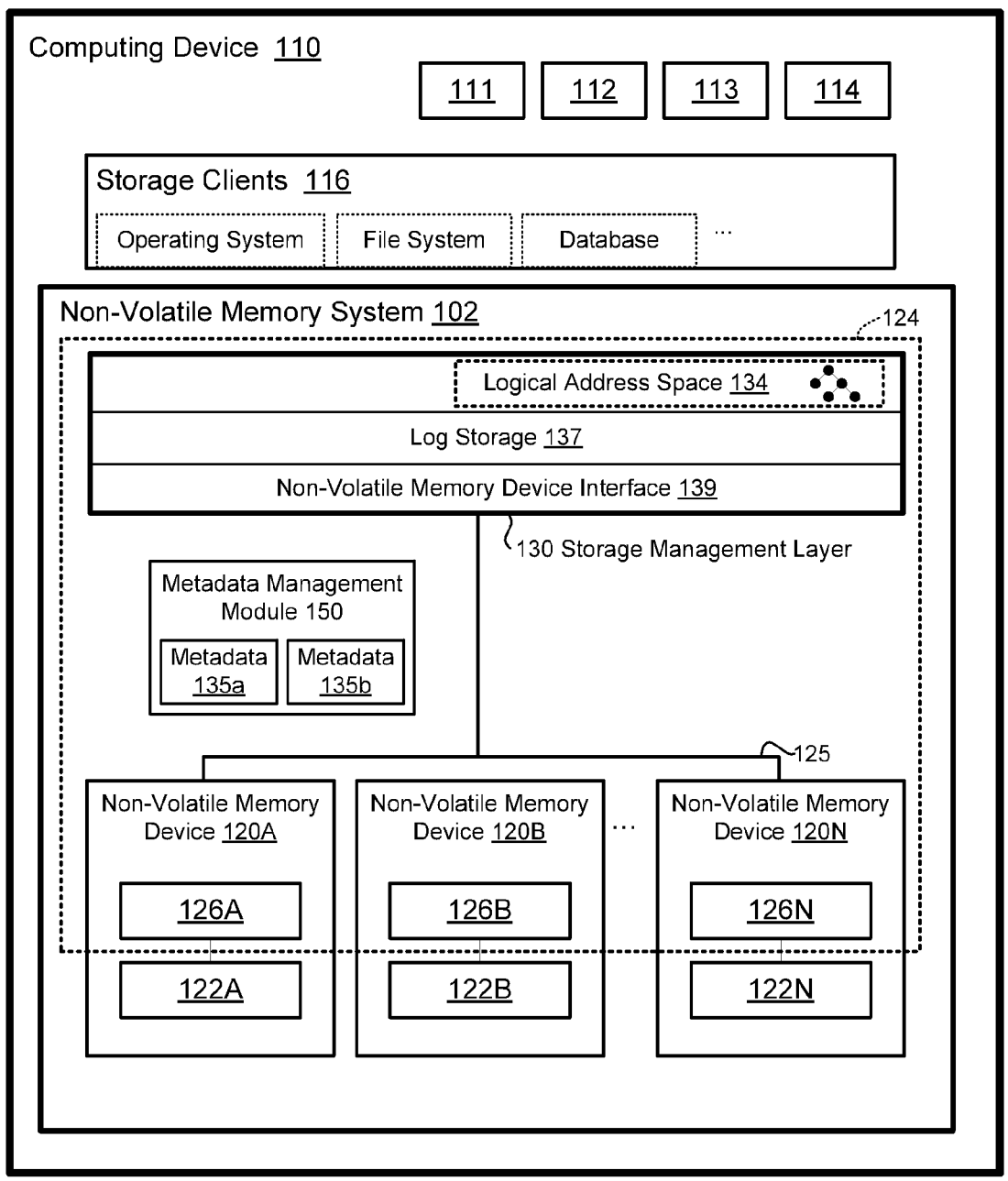
FIG. 1A is a schematic block diagram of one embodiment of a non-volatile memory system comprising a metadata management module.

Aspects of the present disclosure may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable storage media having computer readable program code embodied thereon.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. Where a module or portions of a module are implemented in software, the software portions are stored on one or more computer readable storage media.

Any combination of one or more computer readable storage media may be utilized. A computer readable storage medium may be, for example, but not limited to, an electronic, magnetic, optical, electromagnetic, infrared, or semiconductor system, apparatus, or device, or any suitable combination of the foregoing.

More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), a phase change memory (PCM or PRAM), a portable compact disc read-only memory (CD-ROM), a digital versatile disc (DVD), a blu-ray disc, an optical storage device, a magnetic tape, a Bernoulli drive, a magnetic disk, a magnetic storage device, a punch card, integrated circuits, other digital processing apparatus memory devices, or any suitable combination of the foregoing, but would not include propagating signals. In the context of this document, a computer readable storage medium may be any tangible medium that can contain, or store a program for use by or in connection with an instruction execution system, apparatus, or device.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment of the present disclosure. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise.

Furthermore, the described features, structures, or characteristics of the disclosure may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the disclosure. However, the disclosure may be practiced without one or more of the specific details, or with other methods, components, materials, and so forth. In other instances, well-known structures, materials, or operations are not shown or described in detail to avoid obscuring aspects of the disclosure.

Aspects of the present disclosure are described below with reference to schematic flowchart diagrams and/or schematic block diagrams of methods, apparatuses, systems, and computer program products according to embodiments of the disclosure. It will be understood that each block of the schematic flowchart diagrams and/or schematic block diagrams, and combinations of blocks in the schematic flowchart diagrams and/or schematic block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

These computer program instructions may also be stored in a computer readable storage medium that can direct a computer, other programmable data processing apparatus, or other devices to function in a particular manner, such that the instructions stored in the computer readable storage medium produce an article of manufacture including instructions which implement the function/act specified in the schematic flowchart diagrams and/or schematic block diagrams block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and computer program products according to various embodiments of the present disclosure. In this regard, each block in the schematic flowchart diagrams and/or schematic block diagrams may represent a module, segment, or portion of code, which comprises one or more executable instructions for implementing the specified logical function(s).

It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and computer instructions.

The description of elements in each figure may refer to elements of proceeding figures. Like numbers refer to like elements in all figures, including alternate embodiments of like elements.

According to various embodiments, a non-volatile memory controller manages one or more non-volatile memory devices. The non-volatile memory device(s) may comprise memory or storage devices, such as solid-state storage device(s), that are arranged and/or partitioned into a plurality of addressable media storage locations. As used herein, a media storage location refers to any physical unit of memory (e.g., any quantity of physical storage media on a non-volatile memory device). Memory units may include, but are not limited to: pages, memory divisions, erase blocks, sectors, blocks, collections or sets of physical storage locations (e.g., logical pages, logical erase blocks, described below), or the like.

The non-volatile memory controller may comprise a storage management layer ("SML"), which may present a logical address space to one or more storage clients. One example of an SML is the Virtual Storage Layer® of Fusion-io, Inc. of Salt Lake City, Utah. Alternatively, each non-volatile memory device may comprise a non-volatile memory media controller, which may present a logical address space to the storage clients. As used herein, a logical address space refers to a logical representation of memory resources. The logical address space may comprise a plurality (e.g., range) of logical addresses. As used herein, a logical address refers to any identifier for referencing a memory resource (e.g., data), including, but not limited to: a logical block address ("LBA"), cylinder/head/sector ("CHS") address, a file name, an object identifier, an inode, a Universally Unique Identifier ("UUID"), a Globally Unique Identifier ("GUID"), a hash code, a signature, an index entry, a range, an extent, or the like.

The SML may maintain metadata, such as a forward index, to map logical addresses of the logical address space to media storage locations on the non-volatile memory device(s). The SML may provide for arbitrary, any-to-any mappings from logical addresses to physical storage resources. As used herein, an "any- to any" mapping may map any logical address to any physical storage resource. Accordingly, there may be no pre-defined and/or pre-set mappings between logical addresses and particular, media storage locations and/or media addresses. As used herein, a media address refers to an address of a memory resource that uniquely identifies one memory resource from another to a controller that manages a plurality of memory resources. By way of example, a media address includes, but is not limited to: the address of a media storage location, a physical memory unit, a collection of physical memory units (e.g., a logical memory unit), a portion of a memory unit (e.g., a logical memory unit address and offset, range, and/or extent), or the like. Accordingly, the SML may map logical addresses to physical data resources of any size and/or granularity, which may or may not correspond to the underlying data partitioning scheme of the non-volatile memory device(s). For example, in some embodiments, the non-volatile memory controller is configured to store data within logical memory units that are formed by logically combining a plurality of physical memory units, which may allow the non-volatile memory controller to support many different virtual memory unit sizes and/or granularities.

As used herein, a logical memory element refers to a set of two or more non-volatile memory elements that are or are capable of being managed in parallel (e.g., via an I/O and/or control bus). A logical memory element may comprise a plurality of logical memory units, such as logical pages, logical memory divisions (e.g., logical erase blocks), and so on. As used herein, a logical memory unit refers to a logical construct combining two or more physical memory units, each physical memory unit on a respective non-volatile memory element in the respective logical memory element (each non-volatile memory element being accessible in parallel). As used herein, a logical memory division refers to a set of two or more physical memory divisions, each physical memory division on a respective non-volatile memory element in the respective logical memory element.

The logical address space presented by the storage management layer may have a logical capacity, which may correspond to the number of available logical addresses in the logical address space and the size (or granularity) of the data referenced by the logical addresses. For example, the logical capacity of a logical address space comprising $2^{32}$ unique logical addresses, each referencing 2048 bytes (2 KiB) of data may be $2^{43}$ bytes. (As used herein, a kibibyte (KiB) refers to 1024 bytes). In some embodiments, the logical address space may be thinly provisioned. As used herein, a "thinly provisioned" logical address space refers to a logical address space having a logical capacity that exceeds the physical capacity of the underlying non-volatile memory device(s). For example, the storage management layer may present a 64-bit logical address space to the storage clients (e.g., a logical address space referenced by 64-bit logical addresses), which exceeds the physical capacity of the underlying non-volatile memory devices. The large logical address space may allow storage clients to allocate and/or reference contiguous ranges of logical addresses, while reducing the chance of naming conflicts. The storage management layer may leverage the any-to-any mappings between logical addresses and physical storage resources to manage the logical address space independently of the underlying physical storage devices. For example, the storage management layer may add and/or remove physical storage resources seamlessly, as needed, and without changing the logical addresses used by the storage clients.

The non-volatile memory controller may be configured to store data in a contextual format. As used herein, a contextual format refers to a self-describing data format in which persistent contextual metadata is stored with the data on the physical storage media. The persistent contextual metadata provides context for the data it is stored with. In certain embodiments, the persistent contextual metadata uniquely identifies the data that the persistent contextual metadata is stored with. For example, the persistent contextual metadata may uniquely identify a sector of data owned by a storage client from other sectors of data owned by the storage client. In a further embodiment, the persistent contextual metadata identifies an operation that is performed on the data. In a further embodiment, the persistent contextual metadata identifies a sequence of operations performed on the data. In a further embodiment, the persistent contextual metadata identifies security controls, a data type, or other attributes of the data. In a certain embodiment, the persistent contextual metadata identifies at least one of a plurality of aspects, including data type, a unique data identifier, an operation, and a sequence of operations performed on the data. The persistent contextual metadata may include, but is not limited to: a logical address of the data, an identifier of the data (e.g., a file name, object id, label, unique identifier, or the like), reference(s) to other data (e.g., an indicator that the data is associated with other data), a relative position or offset of the data with respect to other data (e.g., file offset, etc.), data size and/or range, and the like. The contextual data format may comprise a packet format comprising a data segment and one or more headers. Alternatively, a contextual data format may associate data with context information in other ways (e.g., in a dedicated index on the non-volatile memory media, a memory division index, or the like).

In some embodiments, the contextual data format may allow data context to be determined (and/or reconstructed) based upon the contents of the non-volatile memory media, and independently of other metadata, such as the arbitrary, any-to-any mappings discussed above. Since the media location of data is independent of the logical address of the data, it may be inefficient (or impossible) to determine the context of data based solely upon the media location or media address of the data. Storing data in a contextual format on the non-volatile memory media may allow data context to be determined without reference to other metadata. For example, the contextual data format may allow the metadata to be reconstructed based only upon the contents of the non-volatile memory media (e.g., reconstruct the any-to-any mappings between logical addresses and media locations).

In some embodiments, the non-volatile memory controller may be configured to store data on one or more asymmetric, write-once media, such as solid-state storage media. As used herein, a "write once" storage medium refers to a storage medium that is reinitialized (e.g., erased) each time new data is written or programmed thereon. As used herein, an "asymmetric" storage medium refers to a storage medium having different latencies for different storage operations. Many types of solid-state storage media are asymmetric; for example, a read operation may be much faster than a write/program operation, and a write/program operation may be much faster than an erase operation (e.g., reading the media may be hundreds of times faster than erasing, and tens of times faster than programming the media). The memory media may be partitioned into memory divisions that can be erased as a group (e.g., erase blocks) in order to, inter alia, account for the asymmetric properties of the media. As such, modifying a single data segment in-place may require erasing the entire erase block comprising the data, and rewriting the modified data to the erase block, along with the original, unchanged data. This may result in inefficient "write amplification," which may excessively wear the media. Therefore, in some embodiments, the non-volatile memory controller may be configured to write data out-of-place. As used herein, writing data "out-of-place" refers to writing data to different media storage location(s) rather than overwriting the data "in-place" (e.g., overwriting the original physical location of the data). Modifying data out-of-place may avoid write amplification, since existing, valid data on the erase block with the data to be modified need not be erased and recopied. Moreover, writing data out-of-place may remove erasure from the latency path of many storage operations (the erasure latency is no longer part of the critical path of a write operation).

The non-volatile memory controller may comprise one or more processes that operate outside of the regular path for servicing of storage operations (the "path" for performing a storage operation and/or servicing a storage request). As used herein, the "path for servicing a storage request" or "path for servicing a storage operation" (also referred to as the "critical path") refers to a series of processing operations needed to service the storage operation or request, such as a read, write, modify, or the like. The path for servicing a storage request may comprise receiving the request from a storage client, identifying the logical addresses of the request, performing one or more storage operations on non-volatile memory media, and returning a result, such as acknowledgement or data. Processes that occur outside of the path for servicing storage requests may include, but are not limited to: a groomer, de-duplication, and so on. These processes may be implemented autonomously and in the background, so that they do not interfere with or impact the performance of other storage operations and/or requests. Accordingly, these processes may operate independent of servicing storage requests.

In some embodiments, the non-volatile memory controller comprises a groomer, which is configured to reclaim memory divisions (e.g., erase blocks) for reuse. The write out-of-place paradigm implemented by the non-volatile memory controller may result in obsolete or invalid data remaining on the non-volatile memory media. For example, overwriting data X with data Y may result in storing Y on a new memory division (rather than overwriting X in place), and updating the any-to-any mappings of the metadata to identify Y as the valid, up-to-date version of the data. The obsolete version of the data X may be marked as invalid, but may not be immediately removed (e.g., erased), since, as discussed above, erasing X may involve erasing an entire memory division, which is a time-consuming operation and may result in write amplification. Similarly, data that is no longer is use (e.g., deleted or trimmed data) may not be immediately removed. The non-volatile memory media may accumulate a significant amount of invalid data. A groomer process may operate outside of the critical path for servicing storage operations. The groomer process may reclaim memory divisions so that they can be reused for other storage operations. As used herein, reclaiming a memory division refers to erasing the memory division so that new data may be stored/programmed thereon. Reclaiming a memory division may comprise relocating valid data on the memory division to a new location. The groomer may identify memory divisions for reclamation based upon one or more factors, which may include, but are not limited to: the amount of invalid data in the memory division, the amount of valid data in the memory division, wear on the memory division (e.g., number of erase cycles), time since the memory division was programmed or refreshed, and so on.

The non-volatile memory controller may be further configured to store data in a log format. As described above, a log format refers to a data format that defines an ordered sequence of storage operations performed on a non-volatile memory media. In some embodiments, the log format comprises storing data in a pre-determined sequence of media addresses of the non-volatile memory media (e.g., within sequential pages and/or erase blocks of the media). The log format may further comprise associating data (e.g., each packet or data segment) with respective sequence indicators. The sequence indicators may be applied to data individually (e.g., applied to each data packet) and/or to data groupings (e.g., packets stored sequentially on a memory division, such as an erase block). In some embodiments, sequence indicators may be applied to memory divisions when the memory divisions are reclaimed (e.g., erased), as described above, and/or when the memory divisions are first used to store data.

In some embodiments the log format may comprise storing data in an "append only" paradigm. The non-volatile memory controller may maintain a current append point at a media address of the non-volatile memory device. The append point may be a current memory division and/or offset within a memory division. Data may be sequentially appended from the append point. The sequential ordering of the data, therefore, may be determined based upon the sequence indicator of the memory division of the data in combination with the sequence of the data within the memory division. Upon reaching the end of a memory division, the non-volatile memory controller may identify the "next" available memory division (the next memory division that is initialized and ready to store data). The groomer may reclaim memory divisions comprising invalid, stale, and/or deleted data, to ensure that data may continue to be appended to the media log.

In other embodiments, the log format may not be strictly "append only." The non-volatile memory controller may insert a logical erase block (LEB), a physical erase block (PEB), or another memory division into the log at a point between a beginning or head of the log, and an end or tail of the log. The insertion point may be between two memory divisions of the non-volatile memory device in the log or the like. In embodiments where data may be inserted into the log, the data of the log may not be ordered sequentially, may be ordered partially sequentially, or the like.

The log format described herein may allow valid data to be distinguished from invalid data based upon the contents of the non-volatile memory media, and independently of other metadata. As discussed above, invalid data may not be removed from the non-volatile memory media until the memory division comprising the data is reclaimed. Therefore, multiple "versions" of data having the same context may exist on the non-volatile memory media (e.g., multiple versions of data having the same logical addresses). The sequence indicators associated with the data may be used to distinguish invalid versions of data from the current, up-todate version of the data; the data that is the most recent in the log is the current version, and previous versions may be identified as invalid.

In the following detailed description, reference is made to the accompanying drawings, which form a part thereof. The foregoing summary is illustrative only and is not intended to be in any way limiting. In addition to the illustrative aspects, embodiments, and features described above, further aspects, embodiments, and features will become apparent by reference to the drawings and the following detailed description.

FIG. 1A is a block diagram of one embodiment of a system 100 comprising a metadata management module 150. The metadata management module 150 may be part of and/or in communication with a storage management layer (SML) 130. The SML 130 may operate on a non-volatile memory system 102 of a computing device 110, which may comprise a processor 111, volatile memory 112, and a communication interface 113. The processor 111 may comprise one or more central processing units, one or more general-purpose processors, one or more application-specific processors, one or more virtual processors (e.g., the computing device 110 may be a virtual machine operating within a host), one or more processor cores, or the like. The communication interface 113 may comprise one or more network interfaces configured to communicatively couple the computing device 110 (and/or non-volatile memory controller 124) to a communication network, such as a Internet Protocol network, a Storage Area Network, or the like.

The computing device 110 may further comprise a non-transitory, computer readable storage media 114. The computer readable storage media 114 may comprise executable instructions configured to cause the computing device 110 (e.g., processor 111) to perform steps of one or more of the methods disclosed herein. Alternatively, or in addition, the storage management layer 130 and/or one or more modules thereof may be embodied as one or more computer readable instructions stored on the non-transitory storage media 114.

The storage management layer 130 may be configured to provide storage services to one or more storage clients 116. The storage clients 116 may include local storage clients 116 operating on the computing device 110 and/or remote, storage clients 116 accessible via the network (and network interface 113). The storage clients 116 may include, but are not limited to: operating systems, file systems, database applications, server applications, kernel-level processes, user-level processes, applications, and the like.

Figure 1B:
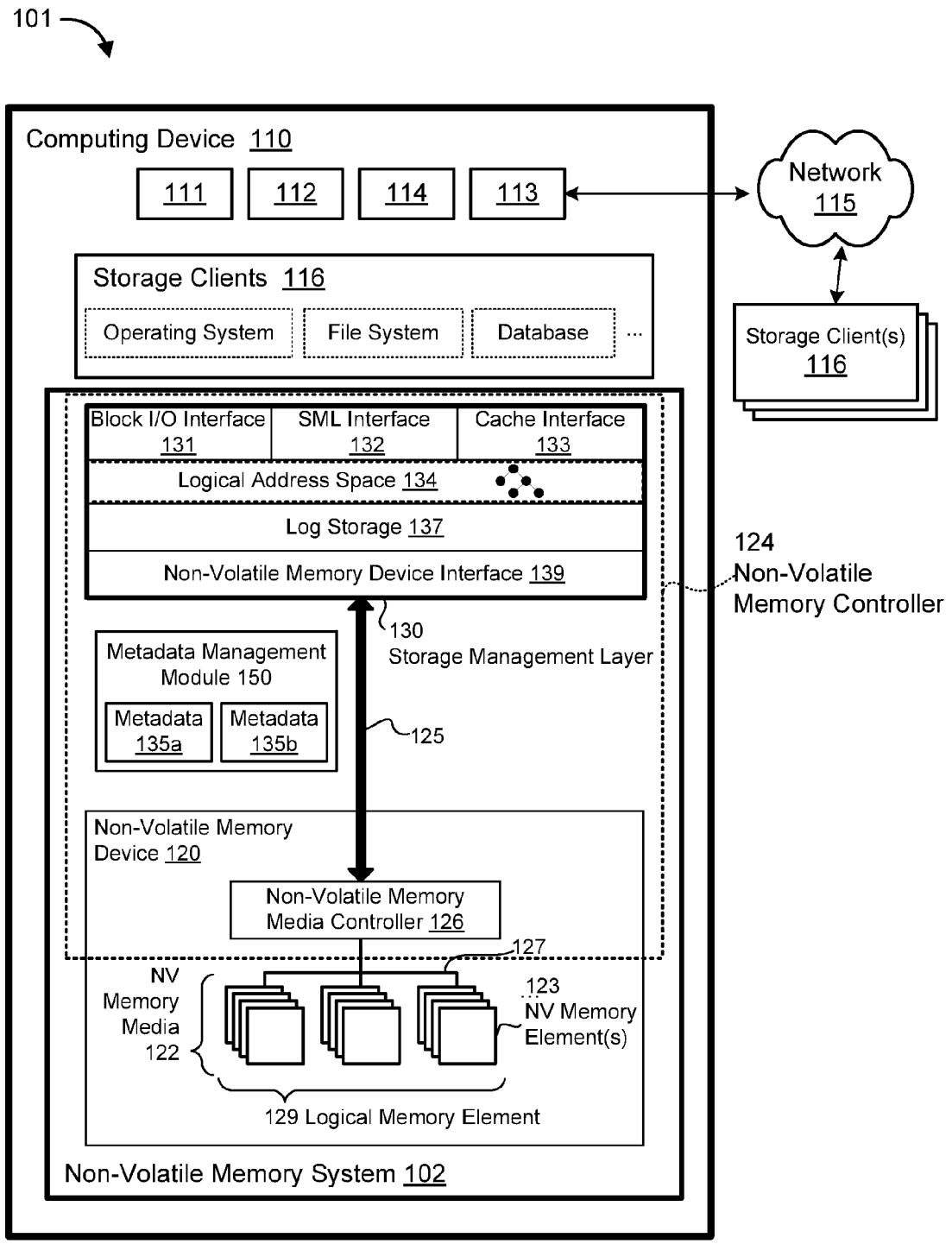
FIG. 1B is a schematic block diagram of another embodiment of a non-volatile memory system comprising a metadata management module.

The storage management layer 130 comprises and/or is communicatively coupled to one or more non-volatile memory devices 120A-N. The non-volatile memory devices 120A-N may include different types of non-volatile memory devices including, but not limited to: solid-state storage devices, hard drives, SAN storage resources, or the like. The non-volatile memory devices 120A-N may comprise respective non-volatile memory media controllers 126A-N and non-volatile memory media 122A-N. As illustrated in FIG. 1B, The SML 130 may provide access to the non-volatile memory devices 120A-N via a traditional block I/O interface 131. Additionally, the SML 130 may provide access to enhanced functionality (large, virtual address space) through the SML interface 132. The metadata 135 may be used to manage and/or track storage operations performed through any of the Block I/O interface 131, SML interface 132, cache interface 133, or other, related interfaces.

The cache interface 133 may expose cache-specific features accessible via the storage management layer 130. Also, in some embodiments, the SML interface 132 presented to the storage clients 116 provides access to data transformations implemented by the non-volatile memory devices 120A-N and/or the non-volatile memory media controllers 126A-N.

The SML 130 may provide storage services through one or more interfaces, which may include, but are not limited to: a block I/O interface, an extended storage management layer interface, a cache interface, and the like. The SML 130 may present a logical address space 134 to the storage clients 116 through one or more interfaces. As discussed above, the logical address space 134 may comprise a plurality of logical addresses, each corresponding to respective media locations on one or more of the non-volatile memory devices 120A-N. The SML 130 may maintain metadata 135 comprising any-to-any mappings between logical addresses and media locations, as described above.

The SML 130 may further comprise a log storage module 137 that is configured to store data in a contextual, log format. The contextual, log data format may comprise associating data with persistent contextual metadata, such as the logical address of the data, or the like. The contextual, log format may further comprise associating data with respective sequence identifiers on the non-volatile memory media 122A-N, which define an ordered sequence of storage operations performed on the non-volatile memory devices 120A-N, as described above.

The SML 130 may further comprise a non-volatile memory device interface 139 configured to transfer data, commands, and/or queries to the non-volatile memory devices 120A-N over a bus 125, which may include, but is not limited to: a peripheral component interconnect express ("PCI Express" or "PCIe") bus, a serial Advanced Technology Attachment ("ATA") bus, a parallel ATA bus, a small computer system interface ("SCSI"), FireWire, Fibre Channel, a Universal Serial Bus ("USB"), a PCIe Advanced Switching ("PCIe-AS") bus, a network, Infiniband, SCSI RDMA, or the like. The non-volatile memory device interface 139 may communicate with the non-volatile memory devices 120A-N using input-output control ("IO-CTL") command(s), IO-CTL command extension(s), remote direct memory access, or the like.

The non-volatile memory system 102, in the depicted embodiment, includes a metadata management module 150. The metadata management module 150, in one embodiment, is configured to maintain multiple sets or types of metadata 135, such as a first set of metadata 135a and a second set of metadata 135b or the like. A set of metadata 135a may be associated with one or more logical addresses for data stored on the non-volatile memory media 122, and may indicate or relate to a state of the data. The metadata management module 150 may maintain different sets of metadata 135 in different locations. For example, the metadata management module 150 may store one set of metadata 135a in the volatile memory 112 of the host computing device 110 and may maintain another set of metadata 135b in the non-volatile memory media 122 of the non-volatile memory device 120. In one embodiment, the metadata management module 150 may maintain both sets of metadata 135 in the volatile memory 112 of the host computing device 110, and may checkpoint or otherwise periodically store one or both sets of metadata 135 to the non-volatile memory media 122, appending the metadata 135a and/or 135b to an append point of a sequential log; writing one or both sets of metadata 135 to an erase block opener, a metadata header, or another predefined location in the non-volatile memory media 122; or otherwise persisting one or both sets of metadata 135.

The metadata management module 150, in certain embodiments, may allow different sets of metadata 135 for the same logical addresses to become out of synchronization with each other, at least temporarily. For example, if managing two sets of metadata 135 and performing an operation on the non-volatile memory media 122, the metadata management module 150 may not update both sets of metadata 135. In this example, the metadata management module 150 may update one of the sets of metadata 135b, in response to the operation, but may wait for a later or subsequent operation before updating the other set of metadata 135a. By allowing different sets of metadata 135 to become out of synchronization, at least temporarily, in certain embodiments, the metadata management module 150 may reduce an amount of time the metadata 135 is restricted from access, may reduce processing overhead for the computing device 110 and/or the non-volatile memory device 120, or the like.

In one embodiment, the metadata management module 150 may manage a logical-to-physical mapping structure for the logical address space 134 that maps logical addresses of the logical address space 134 to physical addresses or locations where the non-volatile memory device 120 stores associated data. A set of metadata 135a, such as a logical-to-physical mapping structure, may also include other metadata, such as an indicator of whether the data associated with a logical address or range of logical addresses is dirty or clean (e.g., whether the data has been destaged to a backing store in a cache context), whether the data is valid or invalid, access rights or security metadata associated with the data, or the like.

In a cache embodiment, where the non-volatile memory device 120 serves as a cache for a backing store device, a destaging or cleaning process as described herein includes copying or moving data that is cached in the non-volatile memory device 120 and not yet stored in the backing store to the backing store. In one embodiment, a dirty indicator in the metadata 135 may indicate that corresponding data in the non-volatile memory device 120 is dirty and that the corresponding data needs to be destaged to an associated backing store.

Another set of metadata 135b may also track or store writes (e.g., dirty data) or other data modifications to a non-volatile memory device 120A; however this second set of metadata 135b may be in a different form. For example, instead of a node tree, the second set of metadata 135b may be a digest or bitmap of indicators for the data stored on a non-volatile memory device 120A. Further examples of a digest or bitmap of indicators will be described in greater detail, with regard to FIG. 6E. The second set of metadata 135b may store an indicator indicating if the data at the logical address is dirty or clean, valid or invalid, recent or frequent, or may store any of the variety of indicators previously described relative to a set of metadata 135, identifying, related to, or associated with a state of the data. In one embodiment, both sets of metadata 135 may contain similar information regarding data being written or otherwise modified on the non-volatile memory device 120A. In one embodiment, a digest or bitmap may be ordered based on when the data was written to the physical locations on the non-volatile recording medium. This may allow the bitmap or digest to be traversed in the order based on when the data was written to the physical locations on the non-volatile recording medium.

In one embodiment, the non-volatile memory system 102 may perform a destaging operation. The metadata management module 150 may scan the first set of metadata in order to find a dirty indicator (indicating that data at a provided address of the non-volatile memory device 120A needs to be destaged). Once the metadata management module 150 finds a dirty indicator in the first set of metadata 135a, the metadata management module 150 scans the corresponding address at the second set of metadata 135b to determine if the second set of metadata 135b also indicates dirty data at the address of the non-volatile memory device 120A. If the metadata management module 150 also finds a dirty indicator in the second set of metadata 135b, then the non-volatile memory system 102 may performed a destaging operation on the data at the specified address of the non-volatile memory device 120A. In response to the destaging operation, the metadata management module 150 may clear the dirty indicator in the second set of metadata 135b to indicate that the data at the specified address is no longer dirty. Furthermore, in order to not restrict access to the first set of metadata 135a, the metadata management module 150 may not update or clear the dirty indicator in the first set of metadata 135a. This may result in a temporary inconsistency between the first set of metadata 135a and the second set of metadata 135b.

In response to a subsequent operation, such as another destaging operation, for example, the metadata management module 150 may again scan the first set of metadata 135a for another dirty indicator. Because the dirty indicator may not have been updated in response to the first destaging operation, the same dirty indicator may be found with an associated corresponding address in the second set of metadata 135b. As previously described, the metadata management module 150 may scan the corresponding address in the second set of metadata 135b for another dirty indicator. Because the metadata management module 150 may have already cleared the dirty indicator in the second set of metadata 135b in response to the initial destaging operation, the dirty indicator may not be found in the second set of metadata 135b. Therefore, the metadata update module 150 may update the dirty indicator in the first set of metadata 135a for the first address to indicate that the data at the address of the non-volatile memory device 120A is no longer dirty. Therefore, the metadata management module 150 may update the first set of metadata 135a based on the subsequent destaging operation and not in response to the first destaging operation. This may resolve the temporary inconsistently between the first set of metadata 135a and the second set of metadata 135b.

The present disclosure distinguishes between an update being "based on" an operation, and being "in response to" an operation. As used herein, updating a set of metadata "in response to" an operation means that the metadata management module 150 updates the set of metadata because of and in temporal proximity to an occurrence of the operation.

"In response to" does not necessarily imply that the update in response to an operation includes or is based on any information associated with the operation. For example, an update in response to an operation to destage data at an address of the non-volatile memory device 120, may update the set of metadata, or alter an indicator in the set of metadata, for data at another address of the non-volatile memory device 120A. "In response to" may also imply that a set of metadata may be updated at a time following the operation, although the amount of time between the operation and the update may not be restricted to any specific amount. Therefore, the metadata may be updated "in response" to a request to destage, however, the destage operation may reflect data not associated with the operation.

Updating a set of metadata "based on" an operation, as used herein, may include the metadata management module 150 updating the set of metadata to reflect a change in the data the metadata represents, caused by or associated with the operation, regardless of any temporal relationship between the update and the operation. For example, "in response to" a destage operation, dirty data of a non-volatile memory device 120A, may be destaged. Subsequently, a set of metadata for the destaged data may be updated to reflect that the data has been destaged and is no longer dirty. In this example, the metadata management module 150 updated the set of metadata "based on" the destaging operation, regardless of the time at which the update occurred. Therefore, "based on" may mean that a set of metadata has been updated to reflect a changed state of data associated with execution of an operation on the data.

The metadata management module 150 may provide lockable write access to the first set of metadata 135a, thereby not allowing other processes of the computing device 110 to access the first set of metadata 135a. However, the metadata management module 150 may still provide access to the second set of metadata 135b, while not allowing access to the first set of metadata 135a. In another embodiment, the metadata management module 150 may provide read-only access to the first set of metadata 135a. The metadata management module 150 may seek for a dirty bit in the first set of metadata 135a without restricting other processes of the computing device 110 to access the first set of metadata 135a. The metadata management module 150 may still provide lockable write access to the second set of metadata 135b in order to update or clear the dirty indicator as previously discussed. The metadata management module 150 may provide lockable write access to the first set of metadata 135a in order to update or clear the dirty indicator in the first set of metadata 135a.

In another embodiment, the metadata management module 150 may provide for a more efficient destaging process by providing varying access methods to a non-volatile memory device 120A based on physical properties of the non-volatile memory system 102. In another embodiment, more than two sets of metadata may provide enhanced access to a non-volatile memory device 120A because one set of metadata may be updated while another set of metadata may simultaneously be used to access the non-volatile memory device 120A. In other words, exclusively locking one set of metadata 135 for writing may still allow access to a non-volatile memory device 120A via another set of metadata 135 for the non-volatile memory device 120A.

In one embodiment, the metadata management module 150 may comprise executable software code, such as a device driver, SML 130, or the like, stored on the computer readable storage media 114 for execution on the processor 111. In another embodiment the metadata management module 150 may comprise logic hardware of one or more of the non-volatile memory devices 120A-N, such as a non-volatile memory media controller 126A-N, a non-volatile memory controller 124, a device controller, a field-programmable gate array ("FPGA") or other programmable logic, firmware for an FPGA or other programmable logic, microcode for execution on a microcontroller, an application-specific integrated circuit ("ASIC"), or the like. In a further embodiment, the metadata management module 150 may include a combination of both executable software code and logic hardware.

In one embodiment, the metadata management module 150 is configured to receive storage requests from the SML 130 via a bus 125 or the like. The metadata management module 150 may be further configured to transfer data to/from the SML 130 and/or storage clients 116 via the bus 125. Accordingly, the metadata management module 150, in some embodiments, may comprise and/or be in communication with one or more direct memory access ("DMA") modules, remote DMA modules, bus controllers, bridges, buffers, and so on to facilitate the transfer of storage requests and associated data. In another embodiment, the metadata management module 150 may receive storage requests as an API call from a storage client 116, as an IO-CTL command, or the like. The metadata management module 150 is described in greater detail below with regard to FIGS. 2 and 3.

FIG. 1B is a block diagram of another embodiment of a system 101 comprising a metadata management module 150. As described above, the metadata management module 150 may be part of and/or in communication with a storage management layer 130. The SML 130 may operate on a non-volatile memory system 102 of a computing device 110, which, as discussed above, may comprise a processor 111, volatile memory 112, communication interface 113, and non-transitory, computer readable storage media 114. The communication interface 113 may comprise one or more network interfaces configured to communicatively couple the computing device 110 (and/or non-volatile memory controller 124) to a network 115 and/or to one or more remote, network-accessible storage clients 116.

The computing device 110 may comprise a non-volatile memory controller 124 that is configured to provide storage services to the storage clients 116. The storage clients 116 may include local storage clients 116 operating on the computing device 110 and/or remote, storage clients 116 accessible via the network 115 (and network interface 113). The non-volatile memory controller 124 comprises one or more non-volatile memory devices 120. Although FIG. 1B depicts a single non-volatile memory device 120, the disclosure is not limited in this regard and could be adapted to incorporate any number of non-volatile memory devices 120.

The non-volatile memory device 120 may comprise non-volatile memory media 122, which may include but is not limited to: NAND flash memory, NOR flash memory, nano random access memory ("nano RAM or NRAM"), nanocrystal wire-based memory, silicon-oxide based sub-10 nanometer process memory, graphene memory, Silicon-Oxide-Nitride-Oxide-Silicon ("SONOS"), resistive RAM ("RRAM"), programmable metallization cell ("PMC"), conductive-bridging RAM ("CBRAM"), magneto-resistive RAM ("MRAM"), dynamic RAM ("DRAM"), phase change RAM ("PRAM or PCM"), magnetic storage media (e.g., hard disk, tape), optical storage media, or the like. While the non-volatile memory media 122 is referred to herein as "memory media," in various embodiments, the non-volatile memory media 122 may more generally comprise a non-volatile recording media capable of recording data, which may be referred to as a non-volatile memory media, a non-volatile storage media, or the like. Further, the non-volatile memory device 120, in various embodiments, may comprise a non-volatile recording device, a non-volatile memory device, a non-volatile storage device, or the like.

The non-volatile memory media 122 may comprise one or more non-volatile memory elements 123, which may include, but are not limited to: chips, packages, planes, die, and the like. A non-volatile memory media controller 126 may be configured to manage storage operations on the non-volatile memory media 122, and may comprise one or more processors, programmable processors (e.g., field-programmable gate arrays), or the like. In some embodiments, the non-volatile memory media controller 126 is configured to store data on (and read data from) the non-volatile memory media 122 in the contextual, log format described above, and to transfer data to/from the non-volatile memory device 120, and so on.

The non-volatile memory media controller 126 may be communicatively coupled to the non-volatile memory media 122 by way of a bus 127. The bus 127 may comprise an I/O bus for communicating data to/from the non-volatile memory elements 123. The bus 127 may further comprise a control bus for communicating addressing and other command and control information to the non-volatile memory elements 123. In some embodiments, the bus 127 may communicatively couple the non-volatile memory elements 123 to the non-volatile memory media controller 126 in parallel. This parallel access may allow the non-volatile memory elements 123 to be managed as a group, forming a logical memory element 129. As discussed above, the logical memory element may be partitioned into respective logical memory units (e.g., logical pages) and/or logical memory divisions (e.g., logical erase blocks). The logical memory units may be formed by logically combining physical memory units of each of the non-volatile memory elements. For example, if the non-volatile memory media 122 comprises twenty-five (25) non-volatile memory elements, each logical memory unit may comprise twenty-five (25) pages (a page of each element of non-volatile memory media 122).

The non-volatile memory controller 124 may comprise a SML 130 and the non-volatile memory media controller 126. The SML 130 may provide storage services to the storage clients 116 via one or more interfaces 131, 132, and/or 133. In some embodiments, the SML 130 provides a block-device I/O interface 131 through which storage clients 116 perform block-level I/O operations. Alternatively, or in addition, the SML 130 may provide a storage management layer (SML) interface 132, which may provide other storage services to the storage clients 116. In some embodiments, the SML interface 132 may comprise extensions to the block device interface 131 (e.g., storage clients 116 may access the SML interface 132 through extensions to the block device interface 131). Alternatively, or in addition, the SML interface 132 may be provided as a separate API, service, and/or library. The SML 130 may be further configured to provide a cache interface 133 for caching data using the non-volatile memory system 102.

As described above, the SML 130 may present a logical address space 134 to the storage clients 116 (through the interfaces 131, 132, and/or 133). The SML 130 may maintain metadata 135 comprising any-to-any mappings between logical addresses in the logical address space 134 and media locations on the non-volatile memory device 120. The metadata 135 may comprise a logical-to-physical mapping structure with entries that map logical addresses in the logical address space 134 and media locations on the non-volatile memory device 120. The logical-to-physical mapping structure of the metadata 135, in one embodiment, is sparsely populated, with entries for logical addresses for which the non-volatile memory device 120 stores data and with no entries for logical addresses for which the non-volatile memory device 120 does not currently store data. The metadata 135, in certain embodiments, tracks data at a block level, with the SML 130 managing data as blocks.

The non-volatile memory system 102 may further comprise a log storage module 137, which, as described above, may be configured to store data on the non-volatile memory device 120 in a contextual, log format. The contextual, log data format may comprise associating data with a logical address on the non-volatile memory media 122. The contextual, log format may further comprise associating data with respective sequence identifiers on the non-volatile memory media 122, which define an ordered sequence of storage operations performed on the non-volatile memory media 122, as described above. The non-volatile memory controller 124 may further comprise a non-volatile memory device interface 139 that is configured to transfer data, commands, and/or queries to the non-volatile memory media controller 126 over a bus 125, as described above.

Figure 2:
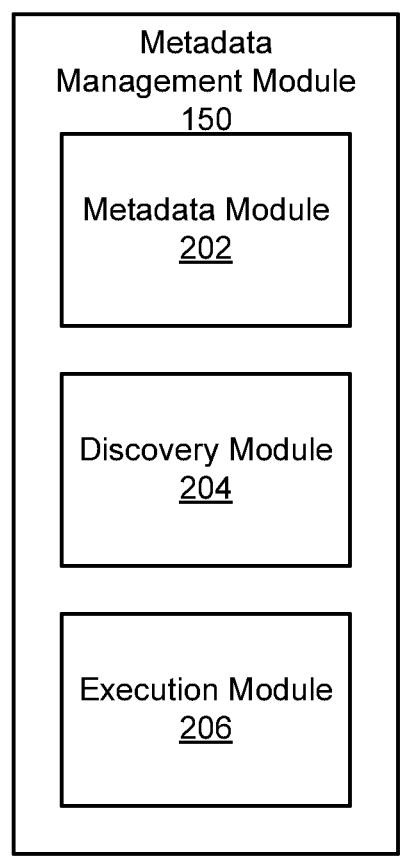
FIG. 2 is a schematic block diagram illustrating one embodiment of a metadata management module.

FIG. 2 depicts one embodiment of a metadata management module 150. The metadata management module 150, in certain embodiments, may be substantially similar to the metadata management module 150 described above with regard to FIGS. 1A and 1B. In the depicted embodiment, the metadata management module 150 includes a metadata module 202, a discovery module 204, and an execution module 206.

The metadata module 202 may perform one or more of the functions described above in relation to the metadata management module 150. In one embodiment, the metadata module 202 may be configured to maintain several sets of metadata as previously described. For example, in response to an operation, the metadata module 202 may update two sets of metadata with similar indicators, and may keep the two sets of metadata synchronized with each other. The sets of metadata may be substantially similar to the two sets of metadata previously described (135a, 135b). In another embodiment, the metadata module 202 may allow temporary inconsistencies between the first set of metadata 135a and the second set of metadata 135b, as previously described regarding the metadata management module 150. In this example, the metadata module 202 may update one set of metadata in response to an operation, but not update the other set of metadata until a subsequent operation. Although the other set of metadata may not be updated until a subsequent operation, the update may still be based on the initial operation. As previously discussed regarding the metadata management module 150, the first set of metadata 135a, and the second set of metadata 135b, may include sets of data that are associated with one or more logical addresses for data stored on a non-volatile memory device 120.

The metadata module 202 may be configured to update a set of metadata 135. In one embodiment, the metadata module 202 may be commanded to perform a variety of functions on the metadata 135. For example, the metadata module 202 may alter an indicator or a value in the metadata 135, update an indicator or a value in the metadata 135, remove an indicator in the metadata 135, add an indicator in the metadata 135, load a new set of indicators into the metadata 135, synchronize a first set of metadata 135a based at least in part on values or indicators in a second set of metadata 135b, or the like.

In one embodiment, metadata module 202 may be configured to maintain more than two sets of metadata. The sets of metadata may be associated with one or more logical addresses for data stored on non-volatile memory media, or the like. The metadata module 202 may modify one or more indicators in a set of metadata based on, but not limited to hardware states, software instructions, commands from other modules, system components, or the like. In one embodiment, metadata module 202 may maintain multiple sets of metadata by keeping them synchronized with each other.

In one embodiment, the metadata module 202 may modify an indicator in one set of metadata for consistency with an updated second set of metadata. In one embodiment, metadata module 202 may maintain multiple sets of metadata, but may allow occasional temporary inconsistencies between the sets of metadata. In one embodiment, one or more sets of metadata may not be updated based, at least in part, on system parameters, performance, security, access permissions, or other, for example. In another embodiment, metadata module 202 may update multiple sets of metadata sequentially, without the execution module 206 executing other operations between metadata updates. Alternatively, in another embodiment, metadata module 202 may update multiple sets of metadata sequentially, and may allow the execution module 206 to execute other instructions, or perform other functions, as discussed herein, between updates of one or more sets of metadata.

For example, in one embodiment where the metadata module 202 manages two sets of metadata, the metadata module 202, may update only one set of metadata in response to the execution module 206 performing an operation on the non-volatile memory media 122. This may result in a temporary inconsistency between the two sets of metadata (135a, 135b). In response to another operation, the metadata module 202, may update both sets of metadata 135 in response to the subsequent operation, and may update the first set of metadata 135a based on the initial operation. Therefore, the metadata module 202 may synchronize the two sets of metadata 135. The metadata module 202 is not limited in this regard, and may update different sets of metadata 135 at different times, or in response to different operations, but the respective updates may or may not be based on the operations being executed. The decision to update sets of metadata 135 may be based on a variety of different factors, including, but not limited to, performance, reliability, stability, efficiency, error recovery, or other property of the non-volatile memory controller 124, or the like, for example.

In another embodiment comprising two sets of metadata, one or more indicators in the first and second sets of metadata may represent substantially similar states. For example, a state may mean a set of metadata having predefined set of indicators. In one embodiment, one set of metadata may substantially represent one state. The discovery module 204, may determine a value of an indicator in one set of metadata based upon the other indicators representing in the set substantially representing a pre-defined state, as previously described. Additional features and capabilities of the discovery module 204 will be later described In one embodiment, the metadata module 202 may update another set of metadata without restricting access to a first set of metadata. For example, the metadata module 202 may lock one set of metadata in order to modify one or more indicators in the set of metadata. The metadata module 202 may still provide read or write access to another set of metadata in response to a request to update metadata on the non-volatile memory device 122. In an embodiment comprising more than two sets of metadata, the metadata module 202 may update one or more sets of metadata without restricting access to the others sets not being concurrently updated. In one embodiment, the metadata module 202 may update one set of metadata based on the value of a corresponding indicator in another set of metadata. For example, if one set of metadata indicates that data at a specified address of the non-volatile memory device 122 is invalid, the metadata module 202 may set a corresponding indicator in another set of metadata in order to indicate that data at the specified address of the non-volatile memory device 122 is invalid. In this way, the metadata module 202 may make more than one set of metadata consistent with each other. The metadata module 202 may do this in response to an operation, a request, or the like.

In one embodiment, the metadata module 202 may read a portion of another set of metadata corresponding to an address in response to detecting a positive indicator for the address in the first set of metadata. A positive [or whatever word you use] indicator indicates that data may not be valid [or whatever]. For example, if the metadata module 202 detected a dirty indicator in a first set of metadata 135a, the metadata module 202 may read a corresponding indicator in a second set of metadata 135b for the corresponding indicator. The metadata module 202 may command the execution module 206 to perform an operation based on one of the value of the indicator in the first set of metadata 135a and the value of the indicator in the second set of metadata 135b, or other sets of metadata, or the like.

The discovery module 204 may be configured to determine a value of an indicator in one of the sets of metadata 135. In one embodiment, the discovery module 204 may read a value of an indicator from a first set of metadata 135a. For example, the metadata module 202 may command the discovery module 204 to return a value of a dirty indicator for a given logical address. In this example, the discovery module 204 may read a first set of metadata 135a for the requested value and return the requested value to the metadata module 202.

In another embodiment, the discovery module 204 may assume a value of an indicator based, at least in part, on an indicator (or lack of an indicator) in another set of metadata. For example, the metadata module 202 may request a value of an indicator in a first set of metadata 135a. In this example, the discovery module 204 may instead read a corresponding value (corresponding to a similar logical address) in the second set of metadata 135b and return the read value. In this example, the discovery module 204 may have assumed a value of an indicator in the first set of metadata 135a, based on a corresponding value in the second set of metadata 135b. The discovery module 204 may return the value of the requested indicator without actually reading the indicator in the requested set of metadata (the first set of metadata 135a in this example).

In another embodiment, indicators in a set of metadata 135 may be in a first state. For example, in a cache environment, a computing device 110 that may have just powered on from an off state, may not have any data in the non-volatile memory device that is valid. In this example, a first set of metadata 135a, may be in a first state (there are no dirty cache entries). Therefore, if the metadata module 202 commands the discovery module 204 to return a value of a dirty indicator, the discovery module 204 may return a 0 or false, or another value without reading a corresponding indicator in a set of metadata 135. In this example, the discovery module 204 may assume a value of a dirty indicator because the set of metadata 135a is in a first state (no dirty indicators).

In one embodiment, the execution module 206 may be configured to perform an operation based on the value of an indicator in a set of metadata. For example, the execution module 206 may request the value of a dirty indicator in a set of metadata 135 from the discovery module 204. The discovery module 204 may return the requested value as previously described. The execution module 206 may perform a destaging process based on the value of the dirty indicator.

In another embodiment, the execution module 206 may perform an operation based on an instruction or command received from the discovery module 206, the metadata module 202, or other. For example, the metadata module 202 may command the execution module 206 to perform a destaging operation based on the value of a dirty indicator in one or more sets of metadata 135. In another example, the discovery module 204 may command the execution module 206 to perform a destaging operation based on the value of a dirty indicator in one or more sets of metadata 135. In another execution module 206 may request the value of an indicator in a set of metadata 135 from the discovery module 204 and may perform an operation based on the value of the received indicator. In one embodiment, the execution module 206 may perform a read operation, a write operation, a copy operation, a destage operation, a storage capacity recovery operation, a background scan operation, or other operation.

In one embodiment, the execution module 206 may receive a request to initiate an operation. In response to receiving a request, the execution module 206 may request that the metadata module 202 check a set of metadata 135 for a positive indicator associated with an address or address range of the request. For example, in response to a destage request for a range of data, the execution module 206 may request that the metadata module 202 check metadata for the range of data for positive indicators identifying dirty data of the range. In response to a storage capacity recovery operation for a range of data such as a logical or physical erase block, the execution module 206 may request that the metadata module 202 check metadata for the range of data for positive indicators identifying invalid data of the range. As described above, in certain embodiments, if the metadata module 202 locates or detects a positive indicator for a range of data in a first set of metadata 135a, the positive indicator may comprise a hint that may be out of synchronization with a second set of metadata 135b, and the metadata module 202 may check the second set of metadata 135b for a positive indicator for the range of data, to either confirm or disprove the hint.

In one embodiment, the execution module 206 may perform storage capacity recovery operations for the non-volatile memory media 122, as part of an autonomous garbage collection process or the like. The execution module 206 may request that the metadata module 202 check a set of metadata 135a for a positive indicator indicating what data associated with one or more storage divisions (e.g., a logical or physical erase block) may be valid, what data may be invalid, or the like in order to select a storage division for storage capacity recovery, in order to identify valid data from a storage division to relocate and preserve, or the like. As described above, in certain embodiments, if the metadata module 202 locates or detects a positive indicator for a range of data in a first set of metadata 135a, the positive indicator may comprise a hint that may be out of synchronization with a second set of metadata 135b, and the metadata module 202 may check the second set of metadata 135b for a positive indicator for the range of data, to either confirm or disprove the hint.

In response to a storage capacity recovery operation, the metadata module 202 may update a second set of metadata 135b, but may not update a first set of metadata 135a. Therefore, in response to a storage capacity recovery operation, a first set of metadata 135a and a second set of metadata 135b may be out of synchronization, as the execution module 206 may move valid data, erase invalid data, or the like. In response to a subsequent storage capacity recovery operation, or another operation on the non-volatile memory media 122, because a first set of metadata 135a may not have been updated based on recovery previous operation, the metadata module 202 may update a first set of metadata 135a based on the initial recovery operation, based on indicators in a second set of metadata 135b, or the like. Therefore, a first set of metadata 135a and a second set of metadata 135b may be synchronized in response to a subsequent recovery operation, the first set of metadata 135a being updated based on the earlier recovery operation.

In one embodiment, the execution module 206 recovers storage capacity of physical non-volatile memory media 122 corresponding to data that is marked as invalid, such as data invalidated by a subsequent write request for one or more logical addresses of the data, or the like. The execution module 206, in certain embodiments, recovers storage capacity of physical non-volatile memory media 122 corresponding to invalid data opportunistically. For example, the execution module 206 may recover storage capacity in response to a storage capacity recovery event, such as a lack of available storage capacity, a percentage of data marked as invalid reaching a predefined threshold level, a consolidation of valid data, an error detection rate for a storage division of physical non-volatile memory media 122 reaching a threshold value, performance crossing a threshold value, a scheduled garbage collection cycle, identifying a storage division of the physical non-volatile memory media 122 with a high amount of invalid data, identifying a storage division of the physical non-volatile memory media 122 with a low amount of wear, or the like.

In one embodiment, the execution module 206 relocates valid data that is in a storage division (e.g., a logical or physical erase block) of the physical non-volatile memory media 122 in the non-volatile memory device 120 that the execution module 206 is recovering to preserve the valid data. For example, the execution module 206 may copy or move valid data from an erase block or other storage division selected for storage capacity recovery forward to an append point of a sequential log-based writing structure, to a new storage division, or the like. Erasing data without relocating the data evicts, removes, deletes, erases, or otherwise clears the data from the non-volatile memory device 120.

In one embodiment, the execution module 206 is part of an autonomous garbage collector system that operates within the non-volatile memory device 120. This allows the non-volatile memory device 120 to manage data to provide wear leveling so that data is systematically spread throughout the solid-state non-volatile memory media 122, or other physical storage media, to improve performance, data reliability, to avoid overuse and underuse of any one location or area of the solid-state non-volatile memory media 122, to lengthen the useful life of the solid-state non-volatile memory media 122, or the like.

The execution module 206, upon recovering a storage division of the physical non-volatile memory media 122, allows the non-volatile memory device 120 to re-use the storage division of the physical non-volatile memory media 122 to store different data. In one embodiment, the execution module 206 adds the recovered storage division of physical non-volatile memory media 122 to an available storage pool for the non-volatile memory device 120, or the like. The execution module 206, in one embodiment, erases existing data in a recovered storage division. In a further embodiment, the execution module 206 allows the non-volatile memory device 120 to overwrite existing data in a recovered storage division.

Whether or not the execution module 206, in one embodiment, erases existing data in a recovered storage division may depend on the nature of the physical non-volatile memory media 122. For example, Flash media requires that cells be erased prior to reuse where magnetic media such as hard drives does not have that requirement. In an embodiment where the execution module 206 does not erase data in a recovered storage division, but allows the non-volatile memory device 120 to overwrite data in the recovered storage division, the execution module 206, in certain embodiments, may mark the data in the recovered storage division as unavailable to service read requests so that subsequent requests for data in the recovered storage division return a null result or an empty set of data until the non-volatile memory device 120 overwrites the data.

In one embodiment, the execution module 206 recovers storage capacity of the non-volatile memory device 120 one or more storage divisions at a time. A storage division, in one embodiment, includes a logical or physical erase block or other predefined division. For flash memory, an erase operation on an erase block writes ones to every bit in the erase block. This may be a lengthy process compared to a program operation which starts with a location being all ones, and as data is written, some bits are changed to zero. However, where the solid-state storage 110 is not flash memory or has flash memory where an erase cycle takes a similar amount of time as other operations, such as a read or a program, the time sequence interface module 306 may erase the data of a storage division as it invalidates data, instead of the execution module 206. Allowing the execution module 206 to operate autonomously and opportunistically within the non-volatile memory device 120 provides a way to separate erase operations from reads, writes, and other faster operations so that the non-volatile memory device 120 operates efficiently.

Figure 3:
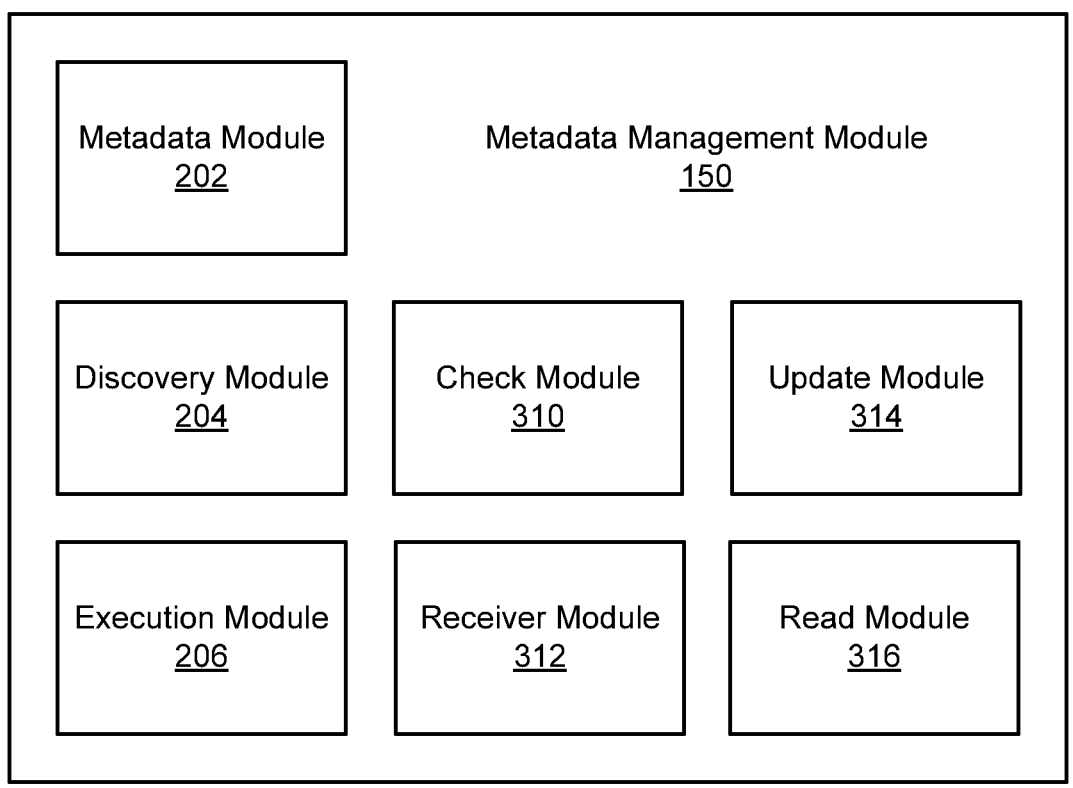
FIG. 3 is a schematic block diagram illustrating one embodiment of a metadata management module.

FIG. 3 depicts one embodiment of a metadata management module 150. In the depicted embodiment, the metadata management module 150 includes the metadata module, 202, the discovery module 204, the execution module 206, and further includes a check module 310, a receiver module 312, an update module 314, and a read module 316.

In certain embodiments, the metadata module 202, the discovery module 204, and the execution module 206 may be substantially similar to the modules described above with regard to FIG. 2. In one embodiment, the check module 310 may perform similar checking functions previously described relative to the discovery module 204. In one embodiment, the check module 310 may check one or more sets of metadata 135 for an indicator. For example, the check module 310 may check an entry in a set of metadata 135 for an indicator that data at a given address of the non-volatile memory device 122 is dirty, clean, valid, invalid, or the like. In one embodiment, a dirty indicator may be positive or negative. A positive dirty indicator may indicate that data at the address is currently dirty and has not yet been destaged to a backing store. Similarly, a negative dirty indicator may indicate that data at the address is currently clean and is stored by a backing store. In another embodiment, a positive clean indicator may indicate that data at the associated address is clean. Similarly, a negative clean indicator may indicate that data at the associated address is dirty. Binary bits may be used to store these various indicators. In one embodiment, a binary zero may represent a negative indicator, and a binary one may represent a positive indicator. In another embodiment, a binary zero may represent a positive indicator, and a binary one may represent a negative indicator.

In another embodiment, a positive valid indicator may indicate that the data at the specified address is currently valid, whereas a negative valid indicator may indicate that the data at the specified address is currently invalid. In one embodiment, a positive invalid indicator may indicate that the data at the specified address is currently invalid, and a negative invalid indicator may indicate that the data at the specified address is currently valid. As previously indicator regarding the dirty indicator, binary bits may be used to represent either a positive or a negative state.

In another embodiment, a recent indicator may be positive or negative. A positive recent indicator may indicate that data for the specified address is a member of or should be added to a recent data pool. A negative recent indicator may indicate that the data is a member of a frequent data pool, should not be added to a recent data pool, or the like. In one embodiment, a frequent indicator may be positive or negative. A positive frequent indicator may indicate that data for the specified address is a member of or should be added to a frequent data pool. A negative frequent indicator may indicate that data for the specified address is a member of a recent data pool, should not be added to a frequent data pool, or the like. As previously described, binary values, may be used to represent positive or negative indicators. In another embodiment, integer values or other data types may be used to represent positive or negative indicators. In one example, a zero may represent a negative indicator, and an integer value other than zero may indicate a positive indicator. Therefore, binary values, integer values, or another predefined state may be used to represent different states of the specified indicators, and this disclosure is not limited in this regard.

In one embodiment, a state of a set of metadata 135 may indicate the presence of a set of positive or negative indicators. The check module 310 may check one set of metadata for a set of indicators indicating a state for data at an address of the non-volatile memory device 122. In one embodiment, the check module 310 may check for an indicator in response to receiving a request to check the set of metadata. In another embodiment, the check module 310 may respond in the affirmative or the negative based on the existence of the indicator requested.

In another embodiment, the check module 310 may request the value of one or more indicators from the read module 316. The check module 310 may check for a single indicator, or a plurality of indicators as previously discussed relative to the discovery module 204. Indicator values may be represented via a single bit, or may be represented via more than one bit, for example. Also, in another embodiment, the check module 310 may assume a value of an indicator based on an indicator being missing from another set of metadata. For example, the check module 310 may receive a request to check the value of a validity indicator for a logical address in a first set of metadata 135a. The check module 310 may determine that a corresponding validity indicator in a second set of metadata 135b is missing. The check module 310 may assume that the validity indicator in the first set of metadata 135a is also missing and return a value indicating that there is no validity indicator for the provided logical address without even checking for the validity indicator in the first set of metadata 135a.

The receiver module 312 may receive requests from the non-volatile memory controller 124 to initiate operations associated with one or more sets of metadata 135. The operations may be for the non-volatile memory device 122. For example, the receiver module 312 may receive a request to initiate a write operation. The metadata management module 150 may update a set of metadata 135 based on the write operation. The receiver module 312 may receive a request to initiate a subsequent operation. The metadata management module 150 may update another set of metadata 135 based on the write operation and the subsequent operation. The update module 314 may update one or more sets of metadata. The update module 314 may perform substantially similar updating functions previously described relative to the metadata module 202.

The update module 314 may update in response to the execution module 206 performing an operation. For example, in one embodiment, update module 314 may update another set of metadata 135 in response to a write operation performed by the execution module 206. In one embodiment, the update module 314 may periodically check two sets of metadata 135, and update one of metadata 135 in response to determining that indicators in the sets of metadata 135 are out of synchronization. For example, the update module 314 may deactivate an indicator in one set of metadata 135a in response to determining that the other set of metadata 135b lacks a corresponding positive indicator (e.g., the first set of metadata 135a is used as a hint, and the hint was incorrect or out of synchronization). In another example, the update module 314 may maintain an indicator in one set of metadata 135a in response to determining that the other set of metadata 135b includes a corresponding positive indicator (e.g., the first set of metadata 135a is used as a hint, and the hint is correct or synchronized).

In one embodiment, the update module 314 may update one set of metadata 135a without updating another set of metadata 135b. In one embodiment, update module 314 may allow three sets of metadata 135 to become out of sync by updating one or two sets of metadata in response to an initial operation. Thereafter, the update module 314 may ensure that the three sets of metadata 135 are synchronized by updating the sets 135 not updated in response to a subsequent operation, and may ensure that the three sets of metadata 135 are updated based on both the initial and subsequent operations. In one embodiment, the update module 314 may synchronize two sets of metadata by copying indicators from one set 135a to the other set 135b or vice versa. The update module 314 is not limited to two sets in this regard. The update module 314 may allow more than two sets of metadata to become unsynchronized, and may ensure that the more than two sets of metadata are synchronized in response to subsequent operations.

In another embodiment, the update module 314 may update one or two sets of metadata based on an inconsistency between two sets of metadata. For example, if the metadata update module 202 finds a positive indicator, or other indicator in one set of metadata 135a, but does not find a corresponding positive indicator in another set of metadata 135b, the update module 314 may update the other set of metadata 135a in order by ensure that the sets of metadata 135 remain synchronized. The update module 314 may be configured to synchronize many indicators either at the same time, or sequentially. More detailed embodiments are described in FIGS. 7 and 8.

The read module 316 may read a portion of one or more sets of metadata. The read module 316 may perform substantially similar reading functions as previously described relative to the metadata module 202. The read module 316, for example, may read a portion of one set of metadata 135 corresponding to an address in another set of metadata 135. In one embodiment, the read module 316 may read a portion of one set of metadata 135 in response to receiver module 312 receiving a command or instruction from another module, such as the check module 310, or other, or the like. In another embodiment, the read module 316 may read an indicator in one set of metadata in response to detecting a positive indicator in another set of metadata.

Figure 4:
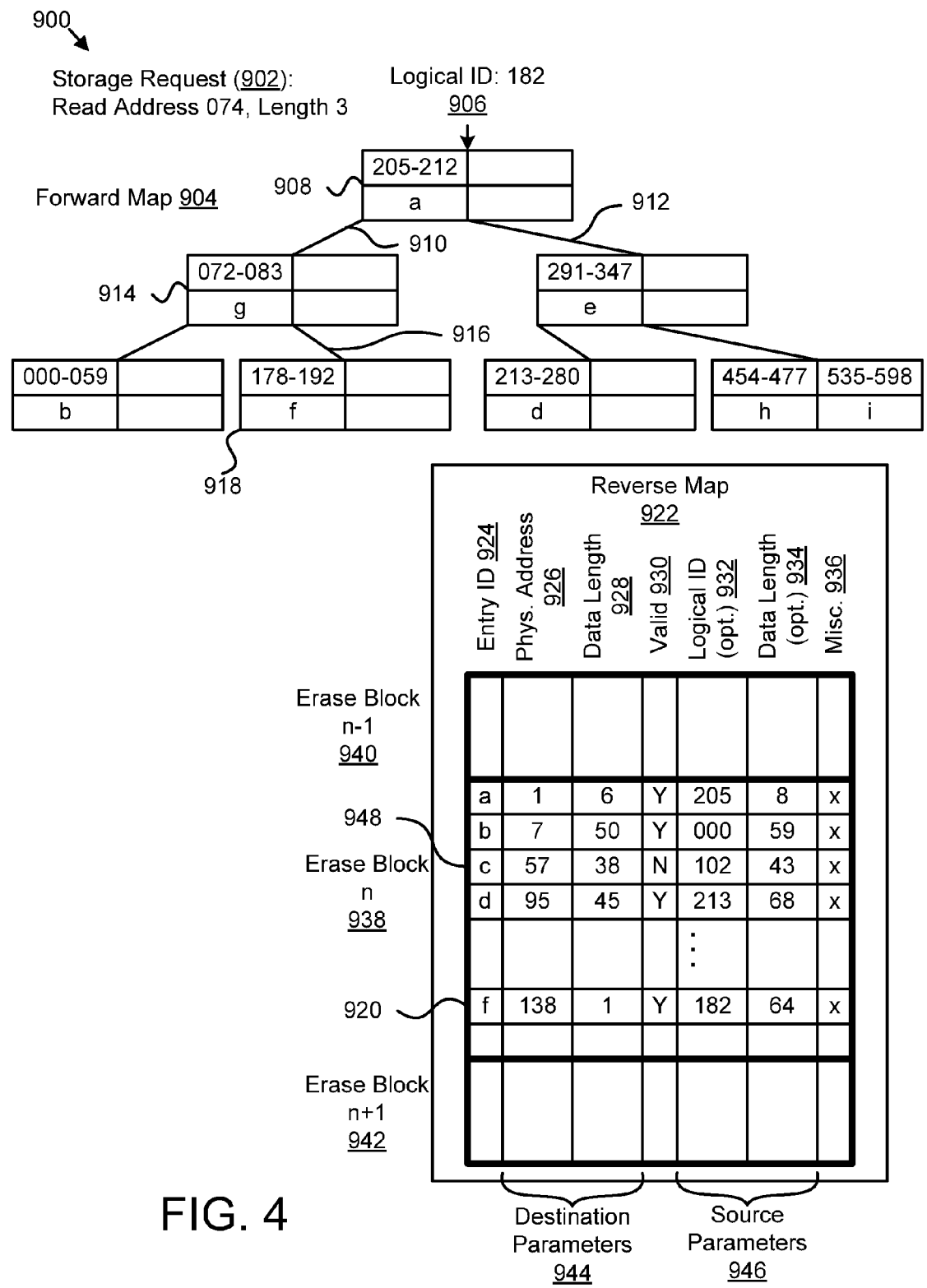
FIG. 4 is a schematic block diagram illustrating one embodiment of a first set of metadata comprising a forward map and a second set of metadata comprising a reverse map.

FIG. 4 depicts one embodiment where one set of metadata 135a includes a forward map 904 and another set of metadata 135b includes a reverse map 922. Typically, non-volatile memory controller 124 detects and/or receives a storage request, such as storage request to read an address. For example, the non-volatile memory controller 124 may receive a logical block storage request 902 to start reading read address "182" and read 3 blocks. The forward map 904 may store logical block addresses as virtual/logical addresses along with other virtual/logical addresses so the non-volatile memory controller 124 may use the forward map 904 to identify a physical address from the virtual/logical address "182" of the storage request 902. In the example, for simplicity, only logical addresses that are numeric are shown, but one of skill in the art will recognize that any logical address may be used and represented in the forward map 904. A forward map 904, in other embodiments, may include alpha-numerical characters, hexadecimal characters, and the like. The forward map 904 is one embodiment of a mapping structure described above with regard to the non-volatile memory controller 124.

In the example, the set of metadata 135 that is the forward map 904 is a simple B-tree. In other embodiments, the set of metadata 135 that is a forward map 904 may be a CAM, a binary tree, a hash table, or other data structure known to those of skill in the art. In the depicted embodiment, a B-Tree includes nodes (e.g. the root node 908) that may include entries of two logical addresses. Each entry, in one embodiment, may include a range of logical addresses. For example, a logical address may be in the form of a logical identifier with a range (e.g., offset and length) or may represent a range using a first and a last address or location. In a further embodiment, each entry may include an indicator of whether the included range of data is dirty or clean (not shown). In one embodiment, the forward map may be organized for traversal in logical address order (e.g., indexed by logical address, logical address ranges, or the like).

Where a single logical address or range of logical addresses is included at a particular node, such as the root node 908, if a logical address 906 being searched is lower than the logical address or addresses of the node, the search will continue down a directed edge 910 to the left of the node 908. If the searched logical address 906 matches the current node 908 (i.e., is located within the range identified in the node), the search stops and the pointer, link, physical address, etc. at the current node 908 is identified. If the searched logical address 906 is greater than the range of the current node 908, the search continues down directed edge 912 to the right of the current node 908. Where a node includes two logical addresses or ranges of logical addresses and a searched logical address 906 falls between the listed logical addresses of the node, the search continues down a center directed edge (not shown) to nodes with logical addresses that fall between the two logical addresses or ranges of logical addresses of the current node 908. A search continues down the B-tree until either locating a desired logical address or determining that the searched logical address 906 does not exist in the B-tree. In one embodiment, membership in the B-tree denotes membership in the non-volatile memory device 120. In certain embodiments, the non-volatile memory device 120 may cache data for a backing store device, and determining that the searched logical address 906 is not in the B-tree or other logical-to-physical mapping structure is a cache miss.

In the example depicted in FIG. 4, the non-volatile memory controller 124 searches for logical address "182" 906 starting at the root node 908. Since the searched logical address 906 is lower than the logical address of 205-212 in the root node 908, the non-volatile memory controller 124 searches down the directed edge 910 to the left to the next node 914. The searched logical address "182" 906 is greater than the logical address (072-083) stored in the next node 914 so the non-volatile memory controller 124 searches down a directed edge 916 to the right of the node 914 to the next node 918. In this example, the next node 918 includes a logical address of 178-192 so that the searched logical address "182" 906 matches the logical address 178-192 of this node 918 because the searched logical address "182" 906 falls within the range 178-192 of the node 918.

Once the non-volatile memory controller 124 determines a match in the forward map 904, the non-volatile memory controller 124 returns a physical address, either found within the node 918 or linked to the node 918. In the depicted example, the node 918 identified by the non-volatile memory controller 124 as containing the searched logical address 906 includes a link "f" that maps to an entry 920 in the reverse map 922.

In the depicted embodiment, for each entry 920 in the reverse map 922 (depicted as a row in a table), the reverse map 922 includes an entry ID 924, a physical address 926, a data length 928 associated with the data stored at the physical address 926 on the solid-state storage media 110 (in this case the data is compressed), a valid tag 930, a logical address 932 (optional), a data length 934 (optional) associated with the logical address 932, and other miscellaneous data 936. In a further embodiment, the reverse map 922 may include an indicator of whether the physical address 926 stores dirty or clean data, valid or invalid data, or the like. The reverse map 922 is organized into erase blocks (erase regions). In this example, the entry 920 that corresponds to the selected node 918 is located in erase block n 938. Erase block n 938 is preceded by erase block n−1 940 and followed by erase block n+1 942 (the contents of erase blocks n−1 and n+1 are not shown). An erase block may be some erase region that includes a predetermined number of pages. An erase region is an area in the solid-state storage media 110 erased together in a storage capacity recovery operation.

While the entry ID 924 is shown as being part of the reverse map 922, the entry ID 924 may be an address, a virtual link, or other means to tie an entry in the reverse map 922 to a node in the forward map 904. The physical address 926 is an address in the solid-state storage media 110 where data that corresponds to the searched logical address 906 resides. The data length 928 associated with the physical address 926 identifies a length of the data packet stored at the physical address 926. (Together the physical address 926 and data length 928 may be called destination parameters 944 and the logical address 932 and associated data length 934 may be called source parameters 946 for convenience.) In the example, the data length 928 of the destination parameters 944 is different from the data length 934 of the source parameters 946 in one embodiment compression the data packet stored on the solid-state storage media 110 was compressed prior to storage. For the data associated with the entry 920, the data was highly compressible and was compressed from 64 blocks to 1 block.

The valid tag 930 indicates if the data mapped to the entry 920 is valid or not. In this case, the data associated with the entry 920 is valid and is depicted in FIG. 4 as a "Y" in the row of the entry 920. Typically the reverse map 922 tracks both valid and invalid data and the forward map 904 tracks valid data. In the example, entry "c" 948 indicates that data associated with the entry 948 is invalid. Note that the forward map 904 does not include logical addresses associated with entry "c" 948. The reverse map 922 typically maintains entries for invalid data so that valid and invalid data can be quickly distinguished during a storage recovery operation. In certain embodiments, the forward map 904 and/or the reverse map 922 may track dirty and clean data in a similar manner to distinguish dirty data from clean data.

The depicted reverse map 922 includes source parameters 946 for convenience, but the reverse map 922 may or may not include the source parameters 946. For example, if the source parameters 946 are stored with the data, possibly in a header of the stored data, the reverse map 922 could identify a logical address indirectly by including a physical address 926 associated with the data and the source parameters 946 could be identified from the stored data. One of skill in the art will recognize when storing source parameters 946 in a reverse map 922 would be beneficial.

The reverse map 922 may also include other miscellaneous data 936, such as a file name, object name, source data, etc. One of skill in the art will recognize other information useful in a reverse map 922. While physical addresses 926 are depicted in the reverse map 922, in other embodiments, physical addresses 926, or other destination parameters 944, may be included in other locations, such as in the forward map 904, an intermediate table or data structure, etc.

Typically, the reverse map 922 is arranged by erase block or erase region so that traversing a section of the map associated with an erase block (e.g., erase block n 938) allows the non-volatile memory controller 124 to identify valid data in the erase block 938 and to quantify an amount of valid data, or conversely invalid data, in the erase block 938. Similarly, the non-volatile memory controller 124, in certain embodiments, may traverse the reverse map 922 and/or the forward map 904 to locate dirty data for destaging, to quantify an amount of dirty data and/or clean data, or the like. Arranging an index into a forward map 904 that can be quickly searched to identify a physical address 926 from a logical address 906 and a reverse map 922 that can be quickly searched to identify valid data and quantity of valid data (and/or dirty data) in an erase block 938 is beneficial because the index may be optimized for searches, storage recovery, and/or destaging operations. One of skill in the art will recognize other benefits of an index with a forward map 904 and a reverse map 922.

In addition to a reverse map 922, a digest may be used. A digest, as used herein, may be an array of one or more values or indicators for logical addresses of the non-volatile memory device 120. A digest, in various embodiments, may include a bit map, a table, a list, and/or another data structure known in the art. For example, a digest may include a data structure suited for managing a very large and potentially sparsely populated domain such as an address space, comprising representations of dirty or invalid storage units (and/or storage unit sets or ranges). For example, a digest may comprise a sparse array with an entry for each storage unit that includes valid data.

In one embodiment, a digest may include an indicator to represent a condition for data stored on a non-volatile memory device 120. A digest may comprise entries for all logical addresses of the non-volatile memory device 120, or may represent portions of the non-volatile memory device 120. In one embodiment, a digest may describe data stored on or may summarize properties or characteristics of data stored at logical addresses of the non-volatile memory device 120. In one example, a digest may be a byte of data for storing 8 Boolean indicators associated with an address for the non-volatile memory device 120. In another example, several bytes or more may be used to describe various properties, values, indicators, or parameters of the data stored at a given logical address of the non-volatile memory device 120. Values, indicators, or parameters stored in a digest may include security settings, access restrictions, address or location of associated data on a backing store, dirty data, valid or invalid data, read data, write data, or other, or the like. Indicators in a digest may include indicators previously described relative to a forward map 904 or a reverse map 922, or later described relative to subsequent figures.

In another embodiment, the digest may be a contiguous array, each element in the array for representing a logical address, or a contiguous block of addresses for data stored on the non-volatile memory device 120. For example, a digest may have one array element for each logical address of a non-volatile memory device 120, thereby representing the entire addressable range of the non-volatile memory device. In another example, a digest may have fewer elements in the array than there are logical addresses for the non-volatile memory device, but may still represent the entire addressable range of the non-volatile memory device 120, some elements in the array representing more than one logical address. In another embodiment, the digest may represent portions of data stored on the non-volatile memory device. For example, a digest may have one half as many elements as there are logical addresses for the non-volatile memory device 120 and thereby only represent one half of the addressable space of the non-volatile memory device 120.

Figure 5:
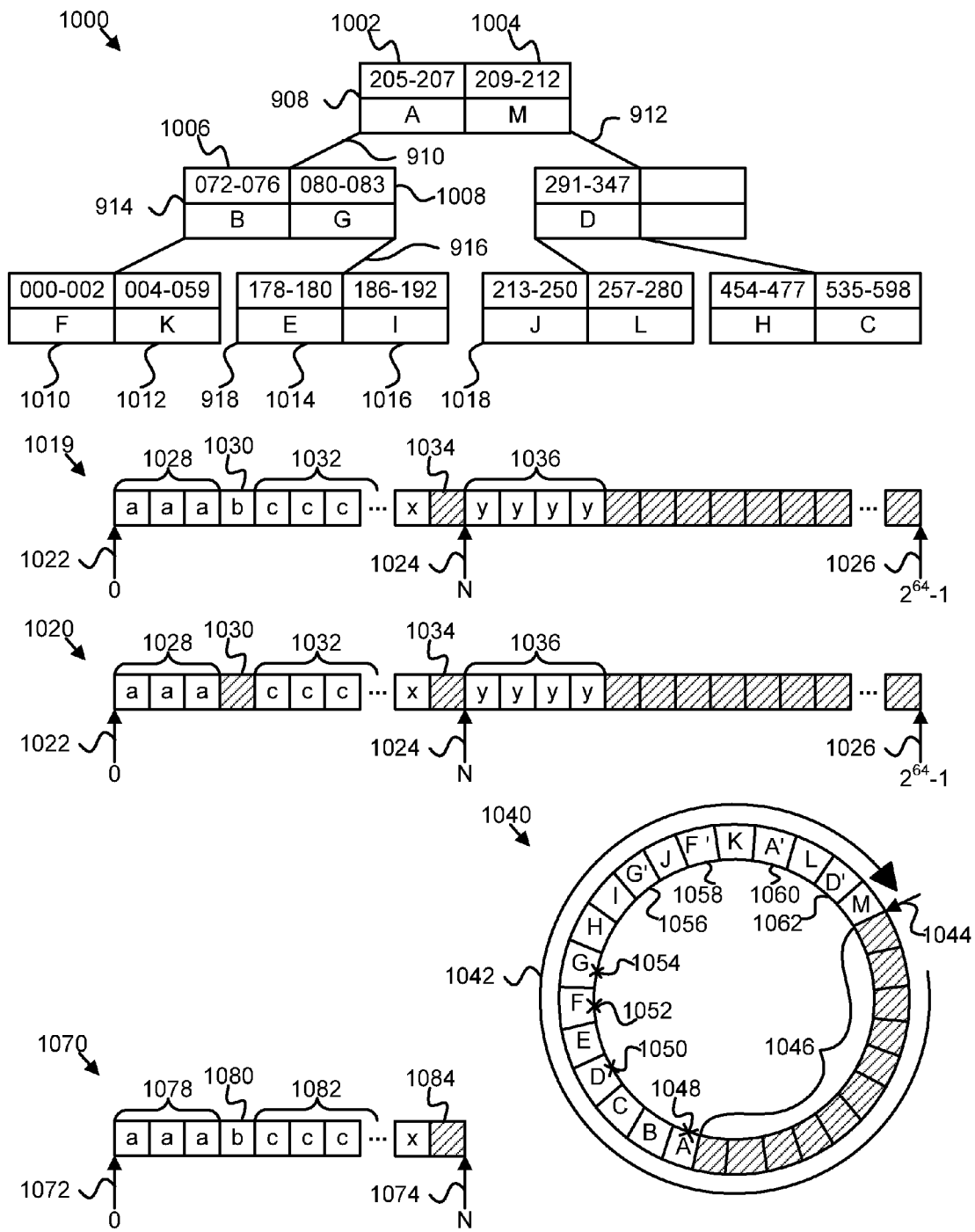
FIG. 5 is a schematic block diagram illustrating one embodiment of a mapping structure for a metadata management module, a logical address space of a cache, a sequential, log-based writing structure, and an address space of a storage device.

FIG. 5 depicts one embodiment of a first set of metadata comprising a mapping structure 1000, a logical address space 1020 of the non-volatile memory device 120, a combined logical address space 1019 that is accessible to a storage client 116, a sequential, log-based writing structure 1040, and a storage device address space 1070 of a backing store. The mapping structure 1000, in one embodiment, is maintained by the non-volatile memory controller 124. The mapping structure 1000, in the depicted embodiment, is a B-tree that is substantially similar to the forward map 904 described above with regard to FIG. 4, with several additional entries. Further, instead of links that map to entries in a reverse map 922, the nodes of the mapping structure 1000 include direct references to physical locations in the non-volatile memory device 120. In one embodiment, entries of the mapping structure 1000 may include references to more than one entry in a set of metadata that is a reverse map 922. The mapping structure 1000, in various embodiments, may be used either with or without a reverse map 922. As described above with regard to the forward map 904 of FIG. 4, in other embodiments, the references in the mapping structure 1000 may include alpha-numerical characters, hexadecimal characters, pointers, links, and the like.

The mapping structure 1000, in the depicted embodiment, includes a plurality of nodes. Each node, in the depicted embodiment, is capable of storing two entries. In other embodiments, each node may be capable of storing a greater number of entries, the number of entries at each level may change as the mapping structure 1000 grows or shrinks through use, or the like. In a further embodiment, each entry may store one or more indicators indicating whether the data corresponding to the entry is clean or dirty, valid or invalid, read data or write data, or the like.

Each entry, in the depicted embodiment, maps a variable length range of logical addresses of the non-volatile memory device 120 to a physical location in the storage media 110 for the non-volatile memory device 120. Further, while variable length ranges of logical addresses, in the depicted embodiment, are represented by a starting address and an ending address, in other embodiments, a variable length range of addresses may be represented by a starting address and a length or by another representation. In one embodiment, the capital letters 'A' through 'M' represent a logical or physical erase block in the physical storage media 110 of the non-volatile memory device 120 that stores the data of the corresponding range of logical addresses. In other embodiments, the capital letters may represent other physical addresses or locations of the non-volatile memory device 120. In the depicted embodiment, the capital letters 'A' through 'M' are also depicted in the writing structure 1040 which represents the physical storage media 110 of the non-volatile memory device 120. Although each range of logical addresses maps simply to an entire erase block, in the depicted embodiment, for simplicity of description, in other embodiments, a single erase block may store a plurality of ranges of logical addresses, ranges of logical addresses may cross erase block boundaries, and the like. In the depicted embodiment, membership in the mapping structure 1000 denotes membership (or storage) in the non-volatile memory device 120. In another embodiment, an entry may further include an indicator of whether the non-volatile memory device 120 stores data corresponding to a logical block within the range of logical addresses, data of the reverse map 922 described above, and/or other data. For example, in one embodiment, the mapping structure 1000 may also map logical addresses of a backing store to physical addresses or locations within a backing store, and an entry may include an indicator that the non-volatile memory device 120 does not store the data and a physical address or location for the data on a backing store. In another embodiment, described below with regard to FIGS. 6A-D, the mapping structure 1000 may also store logical addresses or other metadata corresponding to data that the direct cache module 116b has evicted from the non-volatile memory device 120. The mapping structure 1000, in the depicted embodiment, is accessed and traversed in a similar manner as that described above with regard to the forward map 904.

In the depicted embodiment, the root node 908 includes entries 1002, 1004 with noncontiguous ranges of logical addresses. A "hole" exists at logical address "208" between the two entries 1002, 1004 of the root node. In one embodiment, a "hole" indicates that the non-volatile memory device 120 does not store data corresponding to one or more logical addresses corresponding to the "hole." In one embodiment, a "hole" may exist because the direct cache module 116b evicted data corresponding to the "hole" from the non-volatile memory device 120. If the direct cache module 116b evicted data corresponding to a "hole," in one embodiment, a backing store still stores data corresponding to the "hole." In another embodiment, the non-volatile memory device 120 and/or a backing store supports block I/O requests (read, write, trim, etc.) with multiple contiguous and/or noncontiguous ranges of addresses (i.e., ranges that include one or more "holes" in them). A "hole," in one embodiment, may be the result of a single block I/O request with two or more noncontiguous ranges of addresses. In a further embodiment, a "hole" may be the result of several different block I/O requests with address ranges bordering the "hole."

In FIG. 4, the root node 908 includes a single entry with a logical address range of "205-212," without the hole at logical address "208." If the entry of the root node 908 were a fixed size cache line of a traditional cache, the entire range of logical addresses "205-212" would be evicted together. Instead, in the embodiment depicted in FIG. 5, the direct cache module 116b evicts data of a single logical address "208" and splits the range of logical addresses into two separate entries 1002, 1004. In one embodiment, the direct cache module 116b may rebalance the mapping structure 1000, adjust the location of a directed edge, root node, or child node, or the like in response to splitting a range of logical addresses. Similarly, in one embodiment, each range of logical addresses may have a dynamic and/or variable length, allowing the non-volatile memory device 120 to store dynamically selected and/or variable lengths of logical block ranges.

In the depicted embodiment, similar "holes" or noncontiguous ranges of logical addresses exist between the entries 1006, 1008 of the node 914, between the entries 1010, 1012 of the left child node of the node 914, between entries 1014, 1016 of the node 918, and between entries of the node 1018. In one embodiment, similar "holes" may also exist between entries in parent nodes and child nodes. For example, in the depicted embodiment, a "hole" of logical addresses "060-071" exists between the left entry 1006 of the node 914 and the right entry 1012 of the left child node of the node 914.

The "hole" at logical address "003," in the depicted embodiment, can also be seen in the logical address space 1020 of the non-volatile memory device 120 at logical address "003" 1030. The hash marks at logical address "003" 1030 represent an empty location, or a location for which the non-volatile memory device 120 does not store data. In the depicted embodiment, storage device address "003" 1080 of the storage device address space 1070 does store data (identified as 'b'), indicating that the direct cache module 116b evicted data from logical address "003" 1030 of the non-volatile memory device 120. The "hole" at logical address 1034 in the logical address space 1020, however, has no corresponding data in storage device address 1084, indicating that the "hole" is due to one or more block I/O requests with noncontiguous ranges, a trim or other deallocation command to both the non-volatile memory device 120 and a backing store, or the like.

The logical address space 1020 of the non-volatile memory device 120, in the depicted embodiment, is larger than the physical storage capacity and corresponding storage device address space 1070 of a backing store. In the depicted embodiment, the non-volatile memory device 120 has a 64 bit logical address space 1020 beginning at logical address "0" 1022 and extending to logical address "$2^{64}-1$" 1026. The storage device address space 1070 begins at storage device address "0" 1072 and extends to storage device address "N" 1074. Storage device address "N" 1074, in the depicted embodiment, corresponds to logical address "N" 1024 in the logical address space 1020 of the non-volatile memory device 120. Because the storage device address space 1070 corresponds to only a subset of the logical address space 1020 of the non-volatile memory device 120, the rest of the logical address space 1020 may be shared with an additional non-volatile memory device 120, may be mapped to a different backing store, may store data in the non-volatile memory device 120 (such as a Non-volatile memory cache) that is not stored in the storage device 1070, or the like.

For example, in the depicted embodiment, the first range of logical addresses "000-002" 1028 stores data corresponding to the first range of storage device addresses "000-002" 1078. Data corresponding to logical address "003" 1030, as described above, was evicted from the non-volatile memory device 120 forming a "hole" and a potential cache miss. The second range of logical addresses "004-059" 1032 corresponds to the second range of storage device addresses "004-059" 1082. However, the final range of logical addresses 1036 extending from logical address "N" 1024 extends beyond storage device address "N" 1074. No storage device address in the storage device address space 1070 corresponds to the final range of logical addresses 1036. The non-volatile memory device 120 may store the data corresponding to the final range of logical addresses 1036 until the data backing store is replaced with larger storage or is expanded logically, until an additional data backing store is added, simply use the non-volatile storage capability of the non-volatile memory device 120 to indefinitely provide storage capacity directly to a storage client independent of a backing store, or the like. In a further embodiment, the direct cache module 116 alerts a storage client, an operating system, a user application, or the like in response to detecting a write request with a range of addresses, such as the final range of logical addresses 1036, that extends beyond the storage device address space 1070. The user may perform some maintenance or other remedial operation to address the situation. Depending on the nature of the data, no further action may be taken. For example, the data may represent temporary data which if lost would cause no ill effects.

The second set of metadata comprising a sequential, log-based writing structure 1040, in the depicted embodiment, is a logical representation of the log preserved in the physical storage media 110 of the non-volatile memory device 120. In a further embodiment, a backing store may use a substantially similar sequential, log-based writing structure 1040. In certain embodiments, the non-volatile memory device 120 stores data sequentially, appending data to the writing structure 1040 at an append point 1044. The non-volatile memory device 120, in a further embodiment, uses a storage space recovery process that re-uses non-volatile storage media 110 storing deallocated, unused, or evicted logical blocks. Non-volatile storage media 110 storing deallocated, unused, or evicted logical blocks, in the depicted embodiment, is added to an available storage pool 1046 for the non-volatile memory device 120. By evicting and clearing certain data from the non-volatile memory device 120, as described above, and adding the physical storage capacity corresponding to the evicted and/or cleared data back to the available storage pool 1046, in one embodiment, the writing structure 1040 is ring-like and has a theoretically infinite capacity.

In the depicted embodiment, the append point 1044 progresses around the log-based writing structure 1040 in a circular pattern 1042. In one embodiment, the circular pattern 1042 wear balances the solid-state storage media 110, increasing a usable life of the solid-state storage media 110. In the depicted embodiment, the eviction module 732 and/or the cache write module 714 have marked several blocks 1048, 1050, 1052, 1054 as invalid, represented by an "X" marking on the blocks 1048, 1050, 1052, 1054. The non-volatile memory controller 124, in one embodiment, will recover the physical storage capacity of the invalid blocks 1048, 1050, 1052, 1054 and add the recovered capacity to the available storage pool 1046. In the depicted embodiment, modified versions of the blocks 1048, 1050, 1052, 1054 have been appended to the writing structure 1040 as new blocks 1056, 1058, 1060, 1062 in a read, modify, write operation or the like, allowing the original blocks 1048, 1050, 1052, 1054 to be recovered. In further embodiments, the direct cache module 116*b* may copy forward to the append point 1044 any dirty data and selectively any valid data that the blocks 1048, 1050, 1052, 1054 store, if any.

Figure 6A:
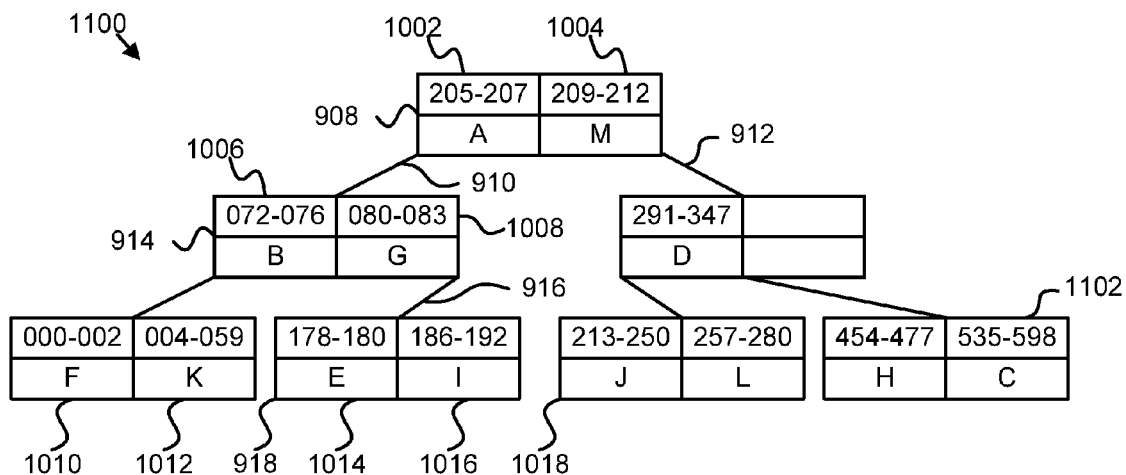
FIG. 6A is a schematic block diagram illustrating one embodiment of a mapping structure and a membership map.

FIG. 6A depicts one embodiment of a first set of metadata comprising a mapping structure 1100 and a second set of metadata comprising a membership map 1110. In the depicted embodiment, the mapping structure 1100 is substantially similar to the mapping structure 1000 of FIG. 5, with similar entries and nodes. The mapping structure 1100, in the depicted embodiment, however, instead of mapping logical addresses to physical locations in the non-volatile memory device 120 as described above, maps logical addresses to pseudo identifiers 1112 in the membership map 1110. The membership map 1110 comprises a secondary mapping structure that provides a layer of abstraction between the mapping structure 1100 and the storage media 110 of the non-volatile memory device 120. Use of the membership map 1110 may reduce the number of accesses to the mapping structure 1100 and/or the storage media 110.

The membership map 1110, in the depicted embodiment, maps pseudo identifiers 1112 to physical locations 1114 of the storage media 110 of the non-volatile memory device 120, with a NULL physical location 1114 or another predefined invalid physical location 1114 indicating that the non-volatile memory controller 124 has evicted the data of the corresponding logical address or range of logical addresses, that the non-volatile memory device 120 does not yet store data of a read request, or the like. For example, in one embodiment, the physical location 1114 is a physical or logical erase block address (or another region address) and the pseudo identifier 1112 is a pseudo erase block address (or another pseudo region address). In a further embodiment, the pseudo identifier 1112 and/or the physical location 1114 may include block addresses, such as packet addresses, page addresses, offset, or the like, within a region, or other additional address information.

In one embodiment, the metadata management module 150 maintains nodes and/or entries in the mapping structure 1100 for logical addresses or ranges of logical addresses that the non-volatile memory controller 124 evicts from the non-volatile memory device 120. In the depicted embodiment, the non-volatile memory controller 124 has evicted data of logical address range "535-598" from the non-volatile memory device 120 and the metadata management module 150 maintains an evicted metadata entry 1102 and node in the mapping structure 1100 for the evicted logical address range mapping the range to the pseudo identifier 1112 of "C." In response to the non-volatile memory controller 124 evicting the data of logical address range "535-598," in the depicted embodiment, the metadata management module 150 updates the membership map 1110 so that the physical location 1114 for the pseudo identifier 1112 of "C" is NULL.

In other embodiments, the metadata management module 150 may use zero or another predefined invalid physical location 1114 to indicate that the non-volatile memory device 120 does not currently store the data and/or that the non-volatile memory controller 124 has evicted the data. The metadata management module 150, in certain embodiments, may store other membership metadata, such as a frequency count, a pool indicator (e.g., a read/write indicator, a dirty/clean indicator, a recent/frequent indicator, a valid/invalid indicator), or the like as an entry in the mapping structure 1100 and/or as an entry in the membership map 1110. The metadata management module 150 may store membership metadata in the mapping structure 1100 and/or in the membership map 1110 either in place of or in addition to a physical location 1114. For example, the metadata management module 150 may store membership metadata, such as a frequency count, for one or more logical addresses when the non-volatile memory device 120 does not store data associated with the one or more logical addresses, as eviction metadata, preadmission metadata, or the like. In one embodiment, the membership metadata of the mapping structure 1100 and/or of the membership map 1110 comprises eviction metadata associated with data that the non-volatile memory controller 124 evicts from the non-volatile memory device 120. In another embodiment, the membership metadata of the mapping structure 1100 and/or of the membership map 1110 comprises preadmission metadata associated with data that the non-volatile memory device 120 does not yet store.

The membership metadata may include a frequency count, such as a read request count and/or write request count, for a range of one or more logical addresses, as described above with regard to the storage request module 602 and the metadata management module 150. The non-volatile memory controller 124 may wait a preadmission threshold number of read requests before admitting unstored data into the non-volatile memory device 120, may wait a readmission threshold number of read requests before readmitting evicted data into the non-volatile memory device 120, or the like based on a frequency count for the data. In embodiments where the metadata management module 150 selectively stores membership metadata, such as a frequency count or the like, in place of a valid physical location 1114, the metadata management module 150 may store the membership metadata as an entry in the mapping structure 1100 and/or in the membership map 1110 prior to the non-volatile memory controller 124 admitting corresponding data into the non-volatile memory device 120, transition the entry to a valid physical location 1114 in response to the non-volatile memory controller 124 admitting the corresponding data into the non-volatile memory device 120, and transition the entry back to membership metadata in response to the non-volatile memory controller 124 evicting the corresponding data from the non-volatile memory device 120, or the like. In such embodiments, the membership metadata may have a value that is invalid or out-of-bounds for a valid physical location 1114 to indicate that the entry comprises a frequency count or other membership metadata, not a valid physical location 1114. In other embodiments, an entry may comprise a predefined bit, a flag, or another indicator to distinguish membership metadata from a valid physical location 1114.

In a further embodiment, the metadata management module 150 stores a timestamp, a sequence number such as a block or packet number from a log of the non-volatile memory device 120, or the like for each block or range of evicted data, un-stored data, or the like. The metadata management module 150 may determine which data has been evicted and, in certain embodiments, an order of eviction, a time period of an eviction, or the like based on the stored timestamps or sequence numbers. For example, the metadata management module 150, in one embodiment, may compare a stored timestamp or sequence number to a current time, a current sequence number of a log, an oldest sequence number of a log of the non-volatile memory device 120, or the like to determine whether the non-volatile memory controller 124 evicted the data, how long ago the non-volatile memory controller 124 evicted data, in what order the non-volatile memory controller 124 evicted data, or the like. In the depicted embodiment, the metadata management module 150 has also updated the physical location 1114 corresponding to the pseudo identifier 1112 of "G" to NULL in response to the non-volatile memory controller 124 evicting data corresponding to the logical address range "080-083" from another entry 1008.

In one embodiment, the metadata management module 150 periodically expires or ages out entries from the mapping structure 1100 that are associated with evicted data or other un-stored data, such as the depicted entries 1008, 1102. For example, in certain embodiments, the metadata management module 150 may remove the entries 1008, 1102 with evicted metadata from the mapping structure 1100 in response to a predefined time period passing without a subsequent read request for the logical addresses of the entries 1008, 1102, or the like. In another embodiment, the metadata management module 150 may periodically scan the mapping structure 1100 for dangling entries and/or nodes corresponding to evicted data and remove the dangling entries and/or nodes, replace the pseudo identifier 1112 of a dangling entry and/or node with an invalid or NULL pseudo identifier 1112, or the like. In a further embodiment, upon removing, expiring, or aging out an entry from the mapping structure 1100, the metadata management module 150 reuses the pseudo identifier 1112 associated with the removed entries.

In another embodiment, entries of the mapping structure 1100 may include either physical locations 1114 or pseudo identifiers 1112 and the physical locations 1114 are distinguishable from the pseudo identifiers 1112, by a predefined bit, a flag, or the like. For example, in one embodiment, the mapping structure 1100 includes a first set of entries with ranges of logical addresses that map to pseudo identifiers 1112 and also includes a second set of entries with ranges of logical addresses that map directly to a physical location 1114. The mapping structure 1100 may distinguish between pseudo identifiers 1112 and physical locations 1114 with an indicator for each entry, such as a flag, a predefined bit, or the like. For the first set of entries that include a pseudo identifier 1112 without a physical location 1114, the non-volatile memory controller 124 and/or the metadata management module 150 checks the membership map 1110 to either map the pseudo identifier 1112 to a valid physical location 1114 or to determine that the non-volatile memory controller 124 evicted the associated data. For the second set of entries that include a physical location 1114, the non-volatile memory controller 124 and/or the metadata management module 150, in certain embodiments, may map the entry directly to the included physical location 1114, without checking the membership map 1110.

The metadata management module 150, in certain embodiments, may periodically scan the mapping structure 1100 and/or the membership map 1110 to update and/or convert between physical locations 1114 and pseudo identifiers 1112, or the like. For example, the metadata management module 150 may scan the mapping structure 1100 to remove entries for evicted data, such as the "535-598" entry 1102 which maps to the "C" pseudo identifier 1112 and a NULL physical location 1114 in the membership map 1110 and the "080-083" entry 1008 which maps to the "G" pseudo identifier 1112 and a NULL physical location 1114. Pruning entries for evicted data from the mapping structure 1100, in certain embodiments, may increase data structure efficiency of the mapping structure 1100, decreasing access times and the like. The metadata management module 150, upon removing the entries 1102, 1008 from the mapping structure 1100, in a further embodiment, may reuse the pseudo identifiers 1112 of "C" and "G." In another embodiment, the metadata management module 150 may scan the mapping structure 1100 to replace pseudo identifiers 1112 with physical locations 1114 for entries that map to valid physical locations 1114.

In other embodiments, the mapping structure 1100 and/or the membership map 1110 may include additional membership metadata, such as one or more pool membership indicators for evicted data, a log order sequence number for evicted data such as a block or packet number, a frequency count for evicted data or other un-stored data, and/or other metadata related to evicted data or other un-stored data. In certain embodiments, the non-volatile memory controller 124 may evict data from the non-volatile memory device 120 in log order, from oldest toward newest or the like, and the metadata management module 150 may use a log order sequence number to determine which data the non-volatile memory controller 124 has evicted, by comparing the log order sequence number to a last or oldest log order sequence number of a log of the non-volatile memory device 120, or the like. The metadata management module 150 may use log order sequence numbers, in various embodiments, either in place of a membership map 1110, in conjunction with a membership map 1110 to determine which entries to prune or remove from the mapping structure 1100, or the like.

In one embodiment, maintaining metadata for evicted data or other un-stored data, such as entries and/or nodes in the mapping structure 1100 and/or the membership map 1110, assists the direct cache module 116 in balancing and adjusting pool sizes by providing a history or other metadata of the data. In other embodiments, the membership metadata for evicted data or other un-stored data may determine in which pool the data is added to upon a subsequent read request for the data. For example, in certain embodiments, the read pool module 604 may add data directly to a frequent pool upon caching the data if membership metadata for the data indicates that the non-volatile memory controller 124 evicted the data within a predefined amount of time, that a frequency count for the data satisfies a preadmission or readmission threshold, or the like.

In a further embodiment, maintaining metadata for evicted data or other un-stored data may reduce accesses to the storage media 110 of the non-volatile memory device 120, because the non-volatile memory controller 124 does not need to access a reverse map, such as the reverse map 922 or the like, when evicting the data to map evicted data back to the data structure 1100 to remove the entry corresponding to the evicted data, but may instead leave the entry dangling. In other embodiments, instead of using the membership map 1110 and maintaining evicted metadata in the mapping structure 1100, the non-volatile memory controller 124 may access a reverse map 922 from the storage media 110, store a reverse map 922 in volatile memory, read a reverse map 922 from a region upon the non-volatile memory controller 124 grooming the region, or the like and may remove entries and/or nodes from the mapping structure 1100 in response to evicting data corresponding to the entries and/or nodes.

Figures 6B, 6C:
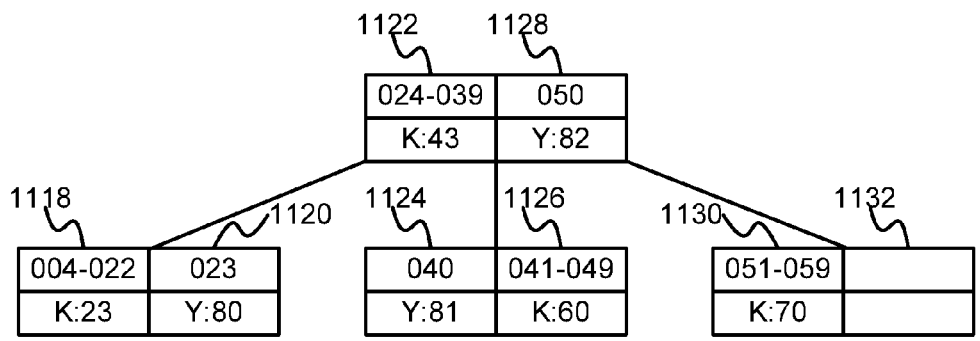
FIG. 6B is a schematic block diagram illustrating one embodiment of a mapping structure entry and a membership map.
FIG. 6C is a schematic block diagram illustrating one embodiment of mapping structure entries and a membership map.

FIG. 6B depicts one embodiment of a first set of metadata comprising a mapping structure entry 1012 and a second set of metadata comprising a membership map 1120a. In one embodiment, the mapping structure entry 1012 is substantially similar to the mapping structure entry 1012 depicted in FIG. 6A, and may be an entry in the mapping structure 1100. The mapping structure entry 1012, in the depicted embodiment, maps logical addresses "004-059" to a pseudo identifier 1112 of "K:23." The format of the pseudo identifier 1112 in the mapping structure entry 1012 is pseudo identifier:offset, where the offset indicates a relative position of data within a region corresponding to the pseudo identifier 1112. In the depicted embodiment, the membership map 1120*a* maps the pseudo identifier 1112 of "K" to the physical location 1114 of "50."

For example, in one embodiment, where the physical location 1114 of "50" is an erase block or other region (such as a logical erase block) of the non-volatile memory device 120, the mapping structure entry 1012 and the membership map 1120*a* indicate that the non-volatile memory device 120 stores data corresponding to logical addresses "004-059" in erase block "50" starting at an offset of "23." The offset, in various embodiments, may indicate a block number within a region, such as a packet number, an ECC chunk number, a sector number, a page number, or the like; a relative address within a region; or another relative position of a region. By including an offset in a mapping structure entry 1012, in certain embodiments, a mapping structure 1100 may map multiple logical addresses and/or ranges of logical addresses to physical locations within the same region.

The membership map 1120*a*, in one embodiment, is substantially similar to the membership map 1110 described above with regard to FIG. 6A, but further includes sequence numbers 1116 corresponding to physical locations 1114. The sequence numbers 1116, in general, identify a time, temporal order, and/or sequence that the direct cache module 116 and/or the storage controller 104 write data to a sequential log-based writing structure of the non-volatile memory device 120. Each sequence number 1116 is unique. In certain embodiments, the sequence number 1116 is a monotonically increasing number having a domain larger than the maximum number of elements that can be assigned sequence numbers 1116. In various embodiments, a sequence number 1116 may include a timestamp, a block or packet number, a region number, or the like. For example, in one embodiment, the storage controller 104 assigns a sequence number and/or records a timestamp for an erase block or other region as the storage controller 104 adds the erase block or other region to a sequential log-based writing structure of the non-volatile memory device 120. In a further embodiment, the storage controller 104 assigns a sequence number and/or records a timestamp for a block, such as a packet, sector, page, ECC chunk, or the like, as the block is written to a sequential log-based writing structure of the non-volatile memory device 120.

FIG. 6C depicts another embodiment of mapping structure entries 1118, 1120, 1122, 1124, 1126, 1128, 1130, 1132 and a membership map 1120*b*. FIG. 6C depicts one example of updates that the non-volatile memory controller 124 may make to the mapping structure entry 1012 and that the metadata management module 150 may make to the membership map 1120*a* to form the depicted membership map 1120*b*. In one embodiment, the non-volatile memory controller 124 and the metadata management module 150 may make the updates in response to the non-volatile memory controller 124 selecting the logical or physical erase block for grooming having physical location 1114 of "50," which logical or physical erase block stores data corresponding to the logical addresses "004-059" of mapping structure entry 1012 (See FIG. 6B).

In the depicted example, upon the non-volatile memory controller 124 selecting erase block having the physical location 114 of "50" for grooming, the non-volatile memory controller 124 determines that the non-volatile memory controller 124 has set a frequency indicator for data at logical addresses "23," "40," and "50" within the range of logical addresses "004-059" from the mapping structure entry 1012. In the example, there is no dirty or invalid data in the range of logical addresses "004-059," and the data of the logical addresses "23," "40," and "50" is either in the frequent read pool 812 of the non-volatile memory device 120 or in the clean write pool 806 and marked as frequently accessed data, or the like.

The non-volatile memory controller 124, in the example, writes the data of logical addresses "23," "40," and "50" forward to the physical location 1114 of "20." In another embodiment, the non-volatile memory controller 124 writes the data of logical addresses "23," "40," and "50" forward to the physical location 1114 of "20" in response to read requests for the data, or the like. The physical location 1114 of "20," in certain embodiments, is a logical erase block or other region at an append point of a sequential log-based writing structure of the non-volatile memory device 120, or the like.

The non-volatile memory controller 124, in the example, updates the mapping structure 1100 by replacing the mapping structure entry 1012 with the mapping structure entries 1118, 1120, 1122, 1124, 1126, 1128, 1130, 1132, splitting the range of logical addresses "004-059" to represent the new physical location 1114 of "20" for the logical addresses "23," "40," and "50." Only the new mapping structure entries 1118, 1120, 1122, 1124, 1126, 1128, 1130, 1132 are depicted in FIG. 6C, for clarity. The mapping structure entries 1118, 1120, 1122, 1124, 1126, 1128, 1130, 1132 may be part of a larger mapping structure such as the mapping structure 1100 of FIG. 6A. The non-volatile memory controller 124 maps the physical location 1114 of "20" to the pseudo identifier 1112 of "Y," with the entry 1120 mapping the logical address of "23" to the pseudo identifier 1112 and offset of "Y:80," the entry 1124 mapping the logical address of "40" to the pseudo identifier 1112 and offset of "Y:81," and the entry 1128 mapping the logical address of "50" to the pseudo identifier 1112 and offset of "Y:82." The membership map 1120*b* maps the pseudo identifier 1112 of "Y" to the physical location 1114 of "20" which is associated with the sequence number 1116 of "0729."

In certain embodiments, where the non-volatile memory controller 124 writes data of the logical addresses "23," "40," and "50," forward on a sequential log-based writing structure of the non-volatile memory device 120 in response to a read request for the data or the like, the membership map 1120*b* may continue to map the pseudo identifier 1112 of "K" to the physical location 1114 of "50" until the non-volatile memory controller 124 erases, clears, or otherwise recovers storage capacity of the physical location 1114 of "50." In one embodiment, the non-volatile memory controller 124 and/or the metadata management module 150 updates the physical location 1114 associated with the pseudo identifier 1112 of "K" in the membership map 1120*b* to "NULL" or to another invalid physical location 1114 in response to the non-volatile memory controller 124 recovering storage capacity of the physical location 1114 of "50" as part of a storage capacity recovery operation or the like.

Instead of removing the entries 1118, 1122, 1126, 1130 for the logical addresses of the evicted data, in the depicted embodiment, the metadata management module 150 maintains the entries 1118, 1122, 1126, 1130 as membership metadata, indicating that the non-volatile memory device 120 previously stored the evicted data. By setting the physical location 1114 associated with the evicted data to "NULL" without removing the entries associated with the evicted data from the mapping structure 1100, in certain embodiments, the metadata management module 150 maintains the membership metadata and updates the status of the evicted data without accessing or locking the mapping structure 1100.

Entries with membership metadata may also inform the non-volatile memory controller 124 that data was prematurely evicted from the non-volatile memory device 120. As described above with regard to the metadata management module 150 of FIG. 1B, for example, the non-volatile memory controller 124 may place data directly in the frequent read pool, bypassing the recent read pool, in response to a subsequent read request (or a threshold number of read requests) for evicted data based on membership metadata indicating that the data was recently evicted, or the like. Maintaining membership metadata indicating a time when the non-volatile memory controller 124 evicted data from the cache can increase the efficiency of the non-volatile memory controller 124 and allow the non-volatile memory controller 124 to make more intelligent, informed eviction decisions.

Use of the membership map 1120b, in a further embodiment, allows the mapping structure 1100 to become unsynchronized with a set of metadata comprising indicators that the non-volatile memory controller 124 maintains. In certain embodiments, as described above with regard to FIG. 6A, the metadata management module 150 may scan the mapping structure 1100 and/or the membership map 1120b at intervals to update entries, or indicators of entries. In one embodiment, the metadata management module 150 scans and updates the mapping structure 1100 and/or the membership map 1120b to synchronize indicator with indicators that the non-volatile memory controller 124 may maintain. Indicators may comprise one of a validity indicator, a dirty data indicator, a frequency indicator, a user indicator, a priority indicator, and a quality-of-service indicator, or the like.

By allowing the mapping structure 1100 and respective indicators to become at least partially unsynchronized, in certain embodiments, the direct cache module 116 may reduce access to the mapping structure 1100, maintain membership metadata for evicted data or other un-stored data, and/or reduce access to the storage media 110 while maintaining indicators using the membership map 1120b and/or using the non-volatile memory controller 124. In other embodiments, instead of using a membership map 1120b and maintaining membership metadata in the mapping structure 1100, the non-volatile memory controller 124 may keep the mapping structure 1100 substantially synchronized with indicators of the non-volatile memory controller 124 such that membership in the mapping structure 1100 indicates membership in the non-volatile memory device 120.

Therefore, depending on whether or not the direct cache module 116 keeps the mapping structure 1100 synchronized with indicators for data of the non-volatile memory device 120, there may be different ways of determining that data of the cache is invalid, or that the data is not in the non-volatile memory device 120. First, if the direct cache module 116 keeps the mapping structure 1100 (e.g., a first set of metadata 135a) synchronized with a validity map or other set of validity metadata (e.g., a second set of metadata 135b), if one or more logical addresses for the data are not in the mapping structure 1100, then the data is either invalid or is not stored in the non-volatile memory device 120. Second, if the direct cache module 116 allows the mapping structure 1100 to continue to map invalid data and/or evicted data, if one or more logical addresses for the data are in the mapping structure 1100 and the membership map 1110 maps the one or more logical addresses to a valid physical location 1114 of the non-volatile memory device 120, then a validity map or other set of validity metadata may indicate whether or not the data is valid. Third, if the direct cache module 116 allows the mapping structure 1100 to continue to map invalid data and/or evicted data, if one or more logical addresses for the data are in the mapping structure 1100 and the membership map 1110 maps the one or more logical addresses to an invalid or NULL physical location 1114, then the data is either invalid or not stored in the non-volatile memory device 120.

Figure 6D:
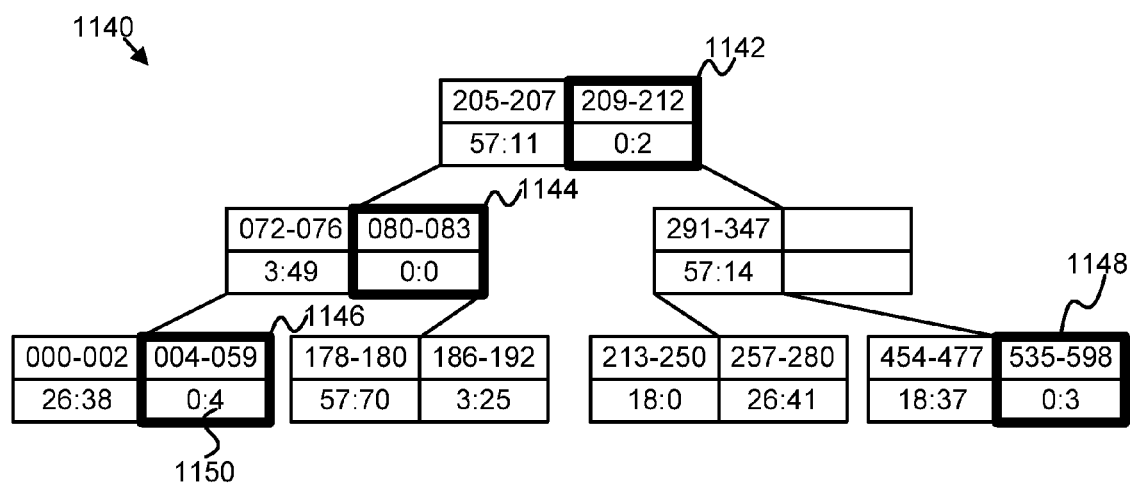
FIG. 6D is a schematic block diagram illustrating one embodiment of a mapping structure and a membership map.

FIG. 6D depicts one embodiment of a mapping structure 1140 that stores membership metadata 1150 (e.g., metadata 135) in entries 1142, 1144, 1146, 1148. The entries 1142, 1144, 1146, 1148 that store membership metadata 1150 instead of a valid physical address are highlighted in FIG. 6D for clarity. The mapping structure 1140, in certain embodiments, may be substantially similar to the mapping structure 1100 of FIG. 6A, but without a membership map 1110. In other embodiments, the mapping structure 1140 may be used in conjunction with a membership map 1110 as described above. The mapping structure 1140, in one embodiment, may represent a subset of a larger mapping structure.

In the depicted embodiment, the metadata management module 150 stores membership metadata 1150 for ranges of logical addresses in the entries 1142, 1144, 1146, 1148 of the mapping structure 1140. The non-volatile memory device 120 does not currently store data for the logical address ranges of entries 1142, 1144, 1146, 1148, as indicated by an invalid or out-of-range physical location stored in entries 1142, 1144, 1146, 1148, described in greater detail below. For example, the non-volatile memory controller 124 may have previously evicted data for the logical address ranges of entries 1142, 1144, 1146, 1148, the non-volatile memory controller 124 may have not yet admitted data for the logical address ranges of entries 1142, 1144, 1146, 1148 into the non-volatile memory device 120, or the like.

The format for entries of the mapping structure 1140, in the depicted embodiment, is region:offset, where the offset indicates a relative position of data within the corresponding region. In one embodiment, the region comprises a logical erase block, physical erase block, or the like and the offset comprises a packet, logical or physical page. ECC chunk, block, sector, or the like within the region. In the depicted embodiment, a value of zero (the "0:" in the region fields of entries 1142, 1144, 1146, 1148) is an invalid or out-of-range value for a region, and a value of zero in the entries 1142, 1144, 1146, 1148 indicates that the non-volatile memory device 120 does not currently store data of the corresponding ranges of logical addresses. The offset corresponding to the region with a value of zero, instead of indicating an offset, comprises membership metadata 1150, such as a frequency count, a pool indicator (e.g., a read/write indicator, a dirty/clean indicator, a recent/frequent indicator, a valid/invalid indicator, or the like), a sequence number, or the like. In the depicted embodiment, the offset for the entries 1142, 1144, 1146, 1148 comprises a frequency count such as a read request count for the corresponding ranges of logical addresses. In other embodiments, instead of replacing a physical location with membership metadata 1150, the entries 1142, 1144, 1146, 1148 of the membership map 1140 may include one or more additional fields for storing membership metadata 1150 separate from a physical location field. Membership metadata may comprise various indicators previously discussed, such as, but not limited to, a validity indicator, a dirty indicator, a frequency indicator, a user indicator, a priority indicator, a quality of service indicator, or other, for example.

In one embodiment, the metadata management module 150 cooperates with the non-volatile memory controller 124 to maintain entries 1142, 1144, 1146, 1148 in the mapping structure 1140 for ranges of logical addresses for which the non-volatile memory device 120 does not currently store data. The metadata management module 150, in certain embodiments, may add an entry 1142, 1144, 1146, 1148 with membership metadata 1150 to the mapping structure 1140 in response to the non-volatile memory controller 124 receiving a read request for a range of one or more logical addresses, even though the data for the read request is not added to the cache. Instead of adding the data of the requested range of logical addresses to the non-volatile memory device 120, in one embodiment, the metadata management module 150 increments a frequency count such as a read request count in an entry 1142, 1144, 1146, 1148 until the frequency count satisfies a preadmission threshold. The non-volatile memory controller 124, in response to the frequency count of an entry 1142, 1144, 1146, 1148 satisfying the preadmission threshold, stores data of the corresponding range of logical addresses from a backing store in the non-volatile memory device 120 and the metadata management module 150 transitions the corresponding entry 1142, 1144, 1146, 1148 from storing a frequency count or other membership metadata 1150 to storing a valid physical location. For example, in the depicted embodiment, the metadata management module 150 may change the region:offset values of an entry 1142, 1144, 1146, 1148 from an invalid value (e.g., zero, NULL) and a frequency count to the actual region and offset of the physical location of the corresponding data in the non-volatile memory device 120.

The metadata management module 150, in another embodiment, in response to the non-volatile memory controller 124 evicting data of a range of logical addresses from the non-volatile memory device 120, transitions a corresponding entry 1142, 1144, 1146, 1148 from storing a valid physical location to storing membership metadata 1150, such as a frequency count, pool indicator, sequence number, other indicator, or the like. For example, the metadata management module 150 may change the region:offset values of an entry 1142, 1144, 1146, 1148 from a valid region value to an invalid value (e.g., zero, NULL) and set a frequency count to zero so that the metadata management module 150 may increment the frequency count to track read requests, write requests, or the like. In response to the frequency count for an entry 1142, 1144, 1146, 1148 satisfying a readmission threshold, the non-volatile memory controller 124 may readmit previously evicted data of an entry 1142, 1144, 1146, 1148 back into the non-volatile memory device 120, and the metadata management module 150 may transition the entry 1142, 1144, 1146, 1148 back to storing a valid physical location for the data in the non-volatile memory device 120. While the metadata management module 150, in the depicted embodiment, uses an invalid physical location of zero to indicate that an entry 1142, 1144, 1146, 1148 corresponds to data the cache does not currently store and that the entry 1142, 1144, 1146, 1148 stores membership metadata 1150, in other embodiments, each entry 1142, 1144, 1146, 1148 may include additional fields for membership metadata 1150, may include a flag or other indicator that the non-volatile memory device 120 does not currently store data of the corresponding range of logical addresses, or the like.

Figure 6E:
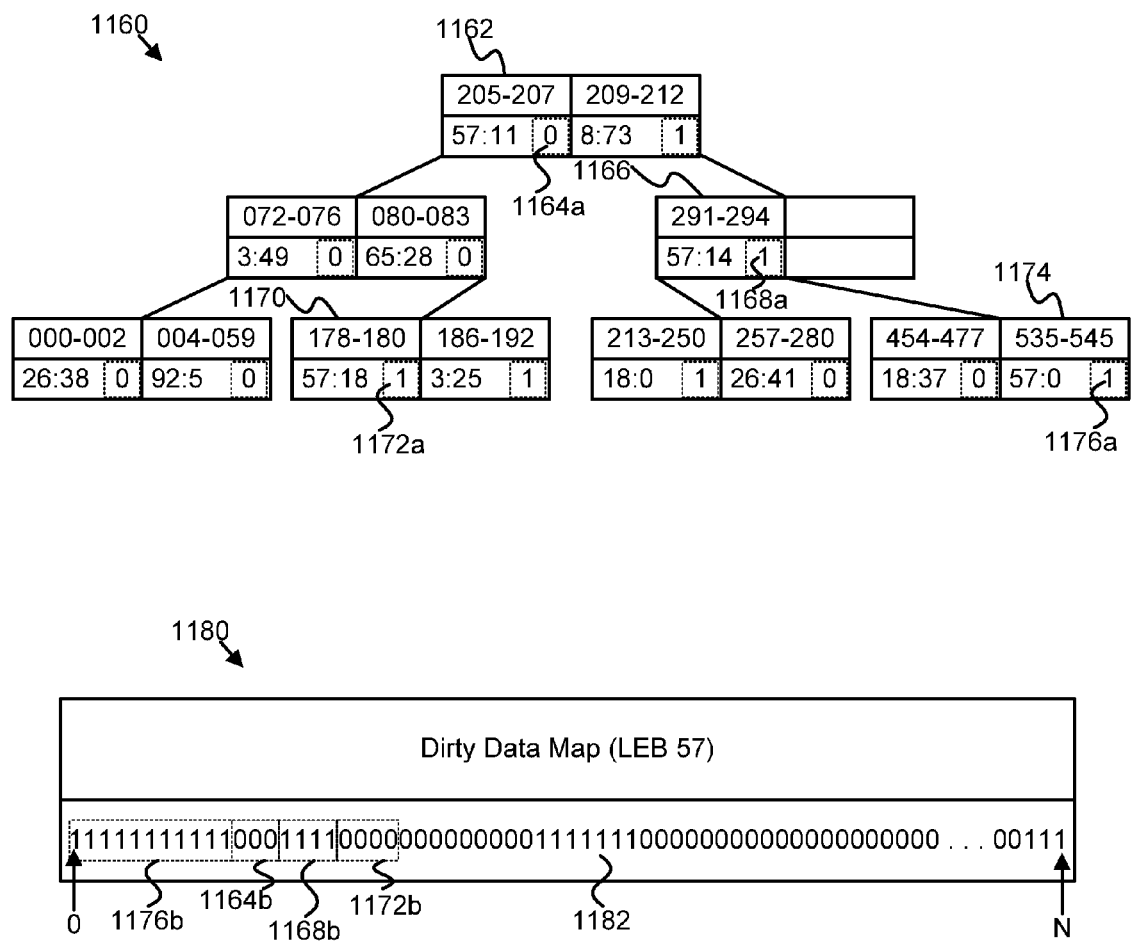
FIG. 6E is a schematic block diagram illustrating one embodiment of a first set of metadata comprising a mapping structure and a second set of metadata comprising a dirty data map.

FIG. 6E depicts one embodiment of a first set of metadata comprising a mapping structure 1160 and a second set of metadata comprising a dirty data map 1180. In the depicted embodiment, the mapping structure 1160 is substantially similar to the mapping structure 1000 of FIG. 5, with similar entries and nodes. The mapping structure 1160, in the depicted embodiment, maps logical addresses to physical locations in the non-volatile memory device 120. The dirty data map 1180 comprises a dirty data bitmap or digest that associates storage units, such as blocks, packets, sectors, pages, ECC chunks, or the like, of the non-volatile memory device 120 (or another storage device acting as a cache for a backing store) with a dirty indicator that specifies that the data associated with the node is either dirty or not dirty (e.g., clean). The dirty indicator, in certain embodiments, includes a bit in the dirty data map 1180, with a positive state (e.g., a binary one) representing dirty data and a negative state (e.g., a binary zero) representing clean or not dirty data.

In one embodiment, the first set of metadata 135a may include the mapping structure 1160 and may include indicators for managing cache data stored at logical addresses of the non-volatile memory device 120. For example, each node of the mapping structure 1160 may include a dirty indicator that may indicate if data at the logical address provided in the node structure is dirty. In one embodiment, the second set of metadata 135b may include the dirty data map 1180. In another embodiment, each node of the mapping structure 1160 may also include an index into the dirty data map 1180 where corresponding indicators 1182 may reside. In one example, node 1162 of the mapping structure includes an index of 57:11, which indicates that corresponding indicators are located at LEB 57 at offset 11 1164b in the membership map 1180. In another example, node 1170 of the mapping structure 1160 includes an index of 57:18, which indicates that the data is located at LEB 57 at offset 18 in the dirty data map 1180.

In one embodiment, an entry in the mapping structure 1160 and a corresponding entry in a dirty data map 1180 are synchronized. In one embodiment, nodes in the mapping structure 1160 may include a dirty indicator. For example, node 1174 may include an indicator 1176a that data at the logical address range provided in the node is dirty. For example, in response to a destaging process, the metadata module 202 may scan, or may command the discovery module 204 to scan the mapping structure 1160 for dirty indicators and may find the dirty indicator 1176a in node 1174. The metadata module 202 may read, or command the discovery module 204 to read the value of the dirty indicator 1176b for address 57:0 in the dirty data map 1180.

The metadata module 202 may read the dirty data map 1180 for address 57:0 (LEB 57, offset 0) and may find a positive dirty indicator 1176b (e.g., a binary one). The metadata module 202 may command the execution module 206 to execute a destaging process for the logical address at the non-volatile memory device 120 provided in the entry 1174. In response to the destaging process completing, the metadata module 202 may update the dirty data map 1180 and set the dirty indicator 1176b at address 57:0 to 0 (not depicted in FIG. 6E). The metadata module 202 may not immediately update the node 1174 of the mapping structure 1160 in response to the destaging process.

In another embodiment, an indicator in a node in the mapping structure 1160 may be out of synchronization with a corresponding indicator in the dirty data map 1180. The metadata module 202 may receive a command to destage and may again scan, or may command the discovery module 204 to scan the mapping structure for dirty indicators and may find the dirty indicator 1172a in node 1170. The metadata module 202 may read, or command the discovery module 204 to read the value of the dirty indicator at address 57:18 provided in node 1170 of the mapping structure 1160. The metadata module 202 may read the membership map 1180 and because the membership map 1180 may have been updated in response to an earlier destage operation, may find a negative indicator 1172b in the membership map 1180 indicating that data in the non-volatile memory device 120 at the logical address provided in node 1170 is no longer dirty. The metadata module 202 may update the dirty indicator 1172a of node 1170 of the mapping structure 1160 in order to reflect that the data is no longer dirty at the specified logical address. Therefore, the data in node 1170 of the mapping structure 1160 has been updated in response to a second destage operation, but the update was based on an earlier destaging operation.

In one embodiment, the metadata module 202 maintains valid/invalid indicators, such as a validity map or an invalidity map, identifying which data in the non-volatile memory device 120 is valid and which data in the non-volatile memory device 120 is invalid. As used herein, a map may refer to any associative data structure associating a collection of unique keys with respective values. Looking up a unique key in a map returns the associated value. The validity map, in one embodiment, associates storage units, such as blocks, packets, sectors, pages, ECC chunks, or the like, of the non-volatile memory device 120 with a validity indicator that specifies that the data associated with the unit is either valid or invalid. The validity indicator, in certain embodiments, includes a bit in the validity map, with one state representing valid data and the other state representing invalid data.

A validity map, in various embodiments, may include a bit map, a table, a list, and/or another data structure known in the art. For example, a validity map may include a data structure suited for managing a very large and potentially sparsely populated domain such as an address space, comprising representations of valid or invalid storage units (and/or storage unit sets or ranges). For example, a validity map may comprise a sparse array with an entry for each storage unit that includes valid data. An invalidity map may be derived from a validity map (e.g., if a location is not in the validity map, then the location is invalid) or vice versa.

In one embodiment, the metadata module 202 updates valid/invalid indicators as new data is written to the non-volatile memory device 120, as data is invalidated, and the like. The metadata module 202, in certain embodiments, switches a valid/invalid indicator for data from valid to invalid in response to a subsequent write request corresponding to an address of the data, described as a write hit. A write hit invalidates the previous data and replaces it with a new or updated version. In another embodiment, the metadata module 202 sets a valid/invalid indicator for data to invalid in response to a TRIM request for the data. In a further embodiment, the metadata module 202 switches a valid/invalid indicator for data from valid to invalid in response to evicting data from the non-volatile memory device 120. The execution module 206, in certain embodiments, upon selecting a region for grooming or garbage collection, trims, erases, clears, or otherwise removes invalid data of the region from the non-volatile memory device 120 based on valid/invalid indicators for data of the region and recovers the storage capacity of the region as part of a storage capacity recovery operation.

The metadata module 202, in certain embodiments, maintains one or more read/write indicators, dirty/clean indicators, recent/frequent indicators, valid/invalid indicators, or the like for data of each region of the non-volatile memory device 120, such as for data of each logical erase block, physical erase block, logical page, physical page, ECC chunk, packet, sector, or the like, indicating one or more states for each data block of a region. For example, in one embodiment, the metadata module 202 maintains a user write map, a dirty data map, a frequent data map, and/or a validity map per erase block of the non-volatile memory device 120, with an indicator in each map for each group of data in the erase block, such as a packet, ECC chunk, page, sector, range of data, or the like. The metadata module 202, in a further embodiment, maintains one or more read/write indicators, dirty/clean indicators, recent/frequent indicators, valid/invalid indicators, or the like in volatile memory, such as volatile memory of the host device 114, volatile memory of the non-volatile memory device 120, or the like. In certain embodiments, the metadata module 202 may periodically store one or more read/write indicators, dirty/clean indicators, recent/frequent indicators, valid/invalid indicators, or the like to the storage media 110 of the non-volatile memory system 102 to persist the indicated data states in non-volatile storage.

In one embodiment, the metadata module 202 sets an indicator that the execution module 206 has destaged data to a backing store to track which write data is in the clean write and which data is in the dirty write pool. The metadata module 202, in one embodiment, sets the indicator that the backing store stores the data once the execution module 206 has successfully written the data to the backing store. Setting the indicator (dirty/clean indicator) that the backing store stores the data, in one embodiment, prevents the execution module 206 from destaging data a second time once the execution module 206 has already destaged the data. In a further embodiment, setting the indicator that the backing store stores the data may affect a grooming cost for a region associated with the data, may alert a garbage collection or grooming process, such as the execution module 206, that the data may be cleared from the non-volatile memory system 102, or the like. Similarly, in a further embodiment, the metadata module 202 sets an indicator that data from a recent read pool of the non-volatile memory system 102 has transitioned to a frequent read pool of the non-volatile memory system 102 in response to a frequent read threshold number of read hits for the data.

The execution module 206, in one embodiment, destages cached data from the dirty write pool of the non-volatile memory system 102 to the backing store. The execution module 206 destages data to the backing store by copying, writing, storing, or otherwise persisting the data in the backing store. The execution module 206 destages dirty write data that the backing store does not yet store. Data that is stored in the non-volatile memory system 102 that is not yet stored in the backing store is referred to as "dirty" data. Once the backing store stores data, the data is referred to as "clean." The execution module 206 destages or cleans data in the non-volatile memory system 102 by writing the data to the backing store.

Figure 7:
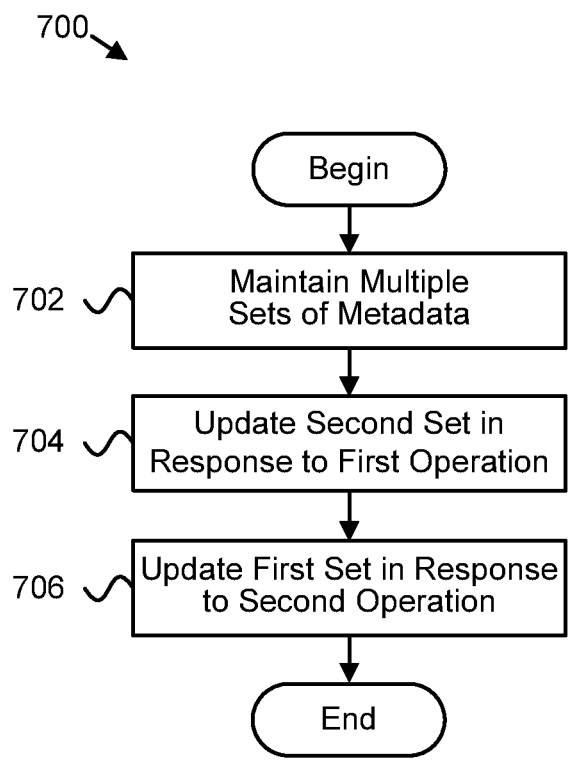
FIG. 7 is a schematic flow chart diagram illustrating one embodiment of a method for managing multiple sets of metadata.

FIG. 7 depicts one embodiment of a method 700 for managing multiple sets of metadata 135. The management of the multiple sets of metadata may or may not be consistent with previous method described herein. The method 700 begins and the metadata module 202 maintains 702 multiple sets of metadata 135. The maintaining 702 may include keeping two or more sets of metadata 135 substantially synchronized. In another embodiment, the maintaining 702 may allow temporary inconsistencies between the two or more sets of metadata 135 as previously described. The metadata module 202 updates 704 a second set of metadata 135b in response to a first operation. The operation may be one of several operations as previously discussed. The metadata module 202 updates 706 a first set of metadata 135a in response to a subsequent operation. The subsequent operation may immediately follow the first operation, or many other operations may take place between the first operation and the subsequent operation. Updating the first set of metadata may be based on data associated with the first operation as previously described.

Figure 8:
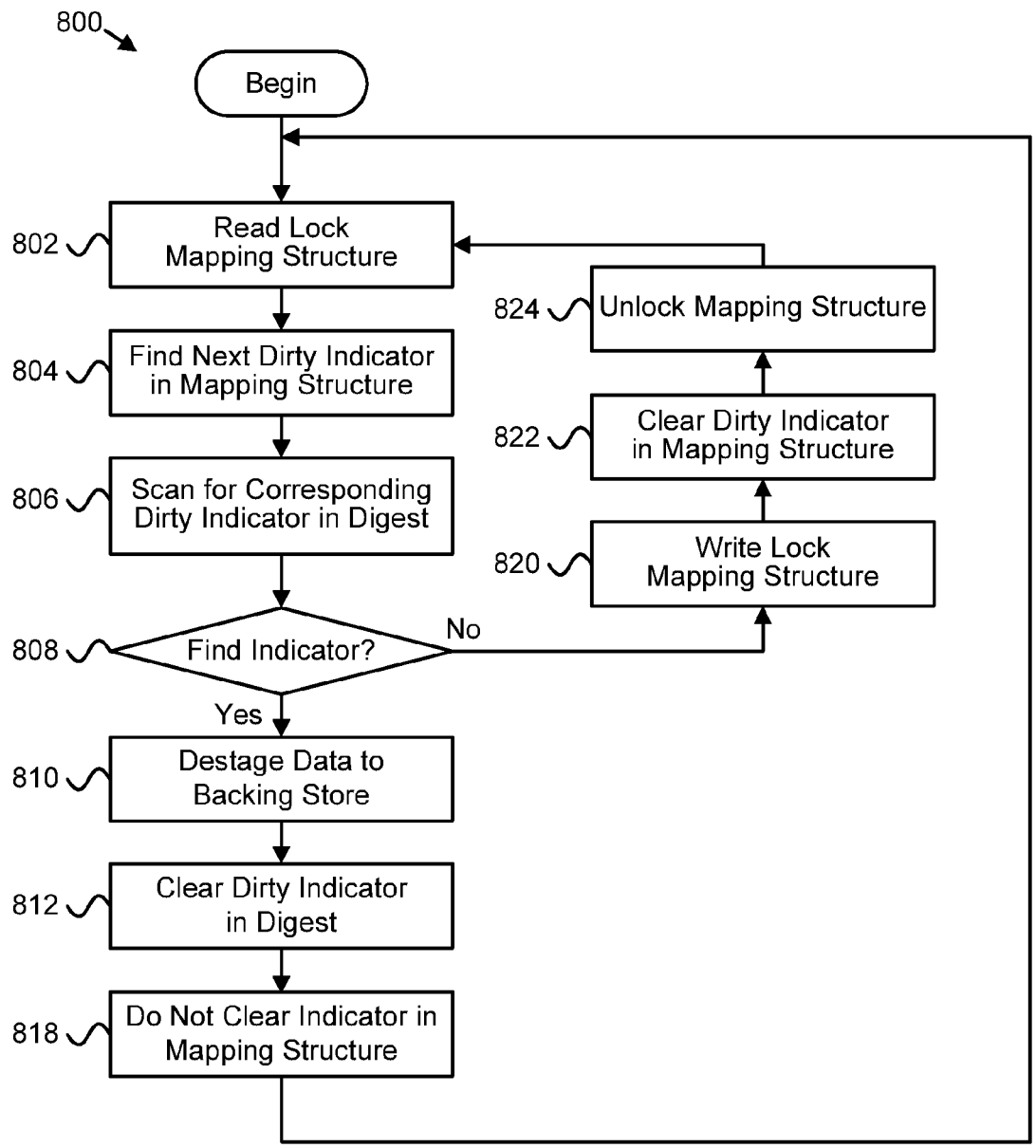
FIG. 8 is a schematic flow chart diagram illustrating one embodiment of a method for managing multiple sets of metadata.

FIG. 8 depicts another embodiment of a method 800 for managing multiple sets of metadata 135. In one embodiment, the metadata module 202 may use two sets of metadata in a destage process. In the depicted embodiment, the first set of metadata 135a includes a mapping structure 1100, as previously described, and the second set of metadata 135b includes a membership map 1180 as previously described relative to FIG. 6E.

The method 800 begins, and the metadata management module 150 read locks 802 the mapping structure 1100. The metadata management module 150 finds 804 the next entry in the mapping structure 1100 that has a positive dirty indicator. The metadata management module 150 scans 806 the membership map 1180 (at the address provided in the mapping structure 1100) for a corresponding dirty indicator. If the metadata management module did not find 808 a corresponding dirty indicator in the membership map 1180, the metadata management module 150 write locks 820 the mapping structure 1100. The metadata management module 150 clears 822 the dirty indicator found in the mapping structure 1100 because the membership map 1180 did not indicate a dirty state. The method then unlocks 824 the mapping structure 1100 and continues the method at block 802 as previously described. In this way, the mapping structure 1100 and the membership map 1180 are more consistent with each other because the dirty indicator has been synchronized.

If the metadata management module 150 did find 808 a corresponding dirty indicator in the membership map 1180, the metadata management module 150 destages 810 the appropriate data to a backing store. The metadata management module 150 clears 812 the dirty indicator in the membership map 1180. The metadata management module 150, does not clear 818 the corresponding indicator in the mapping structure 1100. As previously described, not immediately clearing the dirty indicator in the mapping 1100 structure may provide a more efficient method 800, because the metadata management module 150 did not restrict access to the mapping structure to clear the dirty indicator. This allows other devices to access the mapping structure 1100 during a destage process. Additionally, according to this embodiment of the method 800, the corresponding dirty indicator in the mapping structure 1100 may be cleared at a later time based on another instantiation of the method 800.

Managing a dirty indicator in more than one set of metadata may provide for a more efficient destage process. Sequentially searching a membership map 1180 for dirty indicators may not be efficient. Storing a dirty indicator in a mapping structure, such as mapping structure 1100 may provide for quick access to dirty areas of the non-volatile memory media 122 Also, managing more than one set of metadata during a destage process may provide a more efficient method because one or more sets of metadata may be optimized based on operative properties of a the non-volatile memory controller 124.

A means for updating a set of metadata 135b, 1180 on a non-volatile medium 122 in response to a first operation performed on the data without updating a corresponding indicator in a logical-to-physical mapping structure 135a, 1000, 1100, 1160, in various embodiments, may include a metadata module 202, a metadata management module 150, an update module 314, a non-volatile memory controller 124, other logic hardware, and/or other executable code stored on a computer readable storage medium. Other embodiments may include similar or equivalent means for updating a set of metadata 135b, 1180 on a non-volatile medium 122 in response to a first operation performed on the data without updating a corresponding indicator in a logical-to-physical mapping structure 135a, 1000, 1100, 1160.

A means for updating a corresponding indicator in a logical-to-physical mapping structure 135a, 1000, 1100, 1160 for data in response to a subsequent operation performed on the data, in various embodiments, may include a metadata management module 150, a metadata module 202, an update module 314, a non-volatile memory controller 124, other logic hardware, and/or other executable code stored on a computer readable storage medium. Other embodiments may include similar or equivalent means for updating the corresponding indicator in a logical-to-physical mapping structure 135a, 1000, 1100, 1160 for data in response to a subsequent operation performed on the data.

A means for allowing access to a logical-to-physical mapping structure 135a, 1000, 1100, 1160 during the updating of a set of metadata 135b, 1180 and restricting access to the logical-to-physical mapping structure 135a, 1000, 1100, 1160 during the updating of the corresponding indicator, in various embodiments, may include a metadata module 202, a discovery module 204, a check module 310, an update module 314, a receiver module 312, a read module 316, a non-volatile memory controller 124, other logic hardware, and/or other executable code stored on a computer readable storage medium. Other embodiments may include similar or equivalent means for allowing access to a logical-to-physical mapping structure 135a, 1000, 1100, 1160 during the updating of a set of metadata 135b, 1180 and restricting access to the logical-to-physical mapping structure 135a, 1000, 1100, 1160 during the updating of the corresponding indicator.

A means for receiving a request to initiate a subsequent operation, in various embodiments, may include an execution module 206, a metadata management module 150, a non-volatile memory controller 124, other logic hardware, and/or other executable code stored on a computer readable storage medium. Other embodiments may include similar or equivalent means for receiving a request to initiate a subsequent operation.

A means for checking a logical-to-physical mapping structure 135a, 1000, 1100, 1160 for a positive indicator, in various embodiments, may include a read module 316, a check module 310, a discovery module 204, a metadata management module 150, a non-volatile memory controller 124, other logic hardware, and/or other executable code stored on a computer readable storage medium. Other embodiments may include similar or equivalent means for checking a logical-to-physical mapping structure 135a, 1000, 1100, 1160 for a positive indicator.

A means for checking a set of metadata 135a, 135b for a positive indicator corresponding to an address, in various embodiments, may include a read module 316, a check module 310, a discovery module 204, a metadata management module 150, a non-volatile memory controller 124, a non-volatile memory media controller 126, a non-volatile memory device 120, a storage management layer 130, other logic hardware, and/or other executable code stored on a computer readable storage medium. Other embodiments may include similar or equivalent means for checking a set of metadata 135a, 135b for a positive indicator corresponding to an address.

The present disclosure may be embodied in other specific forms without departing from its spirit or essential characteristics. The described embodiments are to be considered in all respects only as illustrative and not restrictive. The scope of the disclosure is, therefore, indicated by the appended claims rather than by the foregoing description. All changes which come within the meaning and range of equivalency of the claims are to be embraced within their scope.

What is claimed is:

1. A method comprising:
    executing requests to write data on a non-volatile recording medium, by
        storing data segments at respective storage locations of the non-volatile recording medium,
        maintaining a first set of metadata on a volatile recording medium, the first set of metadata associating logical addresses with respective storage locations of stored data segments corresponding to the logical addresses on the non-volatile recording medium and indicating a state of the stored data segments, and
        maintaining a second set of metadata on the non-volatile recording medium, the second set of metadata associating storage locations of the non-volatile recording medium with respective stored data segments corresponding to the logical addresses and indicating a state of the stored data segments;
    updating the second set of metadata in response to a first operation performed on the stored data segments, including a particular stored data segment, wherein the second set of metadata is updated to indicate a state of the particular stored data segment that differs from a state of the particular stored data segment indicated by the first set of metadata, the first set of metadata and the second set of metadata associating the particular stored data segment with a same logical address and a same storage location on the non-volatile recording medium; and
    updating the first set of metadata in response to a subsequent operation performed on the stored data segments, wherein the first set of metadata is updated based on the first operation.

2. The method of claim 1, further comprising:
    receiving a request to initiate the subsequent operation;
    checking the first set of metadata for a positive indicator that a data segment corresponding to a logical address specified in the second operation and stored at a specified storage location on the non-volatile recording medium is in a designated state in response to receiving the request to initiate the second operation; and
    reading a portion of the second set of metadata corresponding to the specified storage location in response to detecting the positive indicator in the first set of metadata indicating that the data segment corresponding to the specified logical address stored at the specified storage location is in the designated state.

3. The method of claim 1, wherein the second set of metadata is updated without restricting access to the first set of metadata.

4. The method of claim 1, wherein updating the first set of metadata based on the first operation comprises setting an indicator pertaining to the state of the particular stored data segment in the first set of metadata based, at least in part, on an indication of the state of the particular stored data segment in the second set of metadata.

5. The method of claim 1, wherein the first set of metadata comprises first entries configured to map logical addresses to storage locations on the non-volatile recording medium of the stored data segments corresponding to the logical addresses, and wherein the second set of metadata comprises a plurality of second entries representing storage locations of the stored data segments on the non-volatile recording medium.

6. The method of claim 5, wherein one of the first entries of the first set of metadata corresponds to a plurality of second entries of the second set of metadata.

7. The method of claim 5, wherein a selected first entry corresponds to the logical address associated with the particular stored data segment and comprises an indicator specifying a state of the particular stored data segment, and wherein updating the first set of metadata based on the first operation comprises modifying the indicator of the selected first entry for consistency with the state of the particular stored data segment indicated by the second set of metadata.

8. The method of claim 7, wherein the indicator comprises one or more of a validity indicator, a dirty data indicator, a frequency indicator, a user indicator, a priority indicator, and a quality-of-service indicator.

9. The method of claim 5, wherein the plurality of first entries are indexed by logical addresses, and wherein the second entries are indexed according to an order the data segments were stored on the storage locations represented by the respective second entries.

10. The method of claim 1, wherein the subsequent operation comprises one of a read operation, a write operation, a destage operation, a storage capacity recovery operation, and a background scan process.

11. A non-transitory computer-readable storage medium storing code executable by a processor to perform operations, comprising:
    storing data segments at respective physical storage addresses of a solid-state storage medium, wherein storing the data segments further comprises,
        maintaining a first set of metadata, the first set of metadata associating logical identifiers of the stored data segments to respective physical storage addresses of the stored data segments on the solid-state storage medium and indicating a state of the respective stored data segments,
        maintaining a second set of metadata, the second set of metadata associating respective physical storage addresses with the stored data segments of the logical identifiers and indicating a state of the respective stored data segments,
        wherein the first set of metadata and the second set of metadata associate a particular stored data segment with a same logical identifier and a same physical storage address, and
    updating the second set of metadata based on a first storage operation pertaining to the non-volatile storage medium, wherein a state of the particular stored data segment indicated by the second set of metadata differs from a state of the particular stored data segment indicated by the first set of metadata; and
    updating the first set of metadata in response to a second storage operation pertaining to the non-volatile storage medium subsequent to the first storage operation, wherein the state of the particular stored data segment indicated by the first set of metadata corresponds to the state of the particular stored data segment indicated by the second set of metadata.

12. The non-transitory computer-readable storage medium of claim 11, wherein the first storage operation comprises destaging the particular stored data segment to a backing store, and wherein the second set of metadata is updated to change the state of the particular stored data segment indicated by the second set of metadata from dirty to clean in response to destaging the particular stored data segment.

13. The non-transitory computer-readable storage medium of claim 12, wherein the first set of metadata is updated to change the state of the particular stored data segment indicated by the first set of metadata from dirty to clean in response to the second storage operation.

14. The non-transitory computer-readable storage medium of claim 11, wherein the second set of metadata is updated to indicate that the particular stored data segment is invalid in response to the first storage operation and while the first set of metadata indicates that the particular stored data segment is valid, and wherein the first set of metadata is updated to indicate that the particular stored data segment is invalid in response to the second storage operation subsequent to the first storage operation.

15. The non-transitory computer-readable storage medium of claim 11, wherein the first set of metadata is accessible while the second set of metadata is updated, and wherein access to at least a portion of the first set of metadata is locked while the first set of metadata is updated.

16. An apparatus, comprising:
a processor;
a non-volatile storage medium;
a storage controller configured to store data blocks at respective storage addresses of the non-volatile storage medium; and
a metadata module configured configured to execute on the processor, the metadata module to manage storage metadata pertaining to the stored data blocks on the non-volatile storage medium, the storage metadata comprising,
first metadata maintained in a first storage location, the first metadata associating logical identifiers with storage addresses of stored data blocks corresponding to the logical identifiers on the non-volatile storage medium, wherein the first metadata associates a particular logical identifier with a particular storage address of a particular stored data block, and
second metadata maintained in a second storage location, independent of the first storage location, the second metadata associating physical storage addresses of the non-volatile storage medium with the stored data blocks corresponding to the logical identifiers, wherein the second metadata associates the particular physical storage address with the particular stored data block, wherein the metadata module is configured to update the second metadata responsive to the storage controller performing a first operation pertaining to the stored data blocks, wherein the second metadata is updated to indicate that a state of the particular stored data block differs from a state of the particular stored data block indicated by the first metadata, and wherein the metadata module is further configured to update the first metadata responsive to the storage controller performing a second operation pertaining to the stored data blocks on the non-volatile storage medium, subsequent to the first operation, wherein the state of the particular data block indicated by the first metadata corresponds to the state of the particular data block indicated by the second metadata.

17. The apparatus of claim 16, wherein the first operation comprises a first destage operation to destage the particular stored data block to a backing store, and wherein the metadata module is configured to clear a dirty indicator for the particular stored data block in the second metadata in response to the storage controller destaging the particular stored data block to the backing store.

18. The apparatus of claim 17, wherein the second operation comprises a second destage operation, and wherein the second destage operation comprises the metadata module accessing the dirty indicator for the particular stored data block in the second metadata in response to determining that the first metadata indicates that the particular stored data block is dirty.

19. The apparatus of claim 18, wherein the particular stored data block is identified as comprising clean data in response to determining that the dirty indicator for the particular stored data block is cleared in the second metadata, and wherein the metadata module clears a dirty indicator for the particular stored data block in the first metadata responsive to the storage controller performing the second destage operation.

20. The apparatus of claim 16, wherein the metadata module is configured to update the second metadata to indicate that the particular stored data block is invalid, and wherein the first metadata indicates that the particular stored data block is valid until the metadata module updates the first metadata responsive to the storage controller performing the second operation.

21. The apparatus of claim 16, wherein the metadata module is configured to provide access to the first metadata while updating the second metadata, and wherein the metadata module is further configured to lock access to at least a portion of the first metadata while updating the first metadata responsive to the storage controller performing the second storage operation.

* * * * *